(12) United States Patent
Hefner, Jr. et al.

(10) Patent No.: US 8,318,834 B2
(45) Date of Patent: Nov. 27, 2012

(54) EPOXY RESIN REACTIVE DILUENT COMPOSITIONS

(75) Inventors: Robert E. Hefner, Jr., Lake Jackson, TX (US); John W. Hull, Jr., Midland, MI (US); James W. Ringer, Midland, MI (US); John N. Argyropoulos, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 24 days.

(21) Appl. No.: 12/988,874

(22) PCT Filed: May 4, 2009

(86) PCT No.: PCT/US2009/042645
§ 371 (c)(1),
(2), (4) Date: Oct. 21, 2010

(87) PCT Pub. No.: WO2009/142900
PCT Pub. Date: Nov. 26, 2009

(65) Prior Publication Data
US 2011/0046266 A1    Feb. 24, 2011

Related U.S. Application Data

(60) Provisional application No. 61/055,239, filed on May 22, 2008.

(51) Int. Cl.
*C08G 59/60* (2006.01)
(52) U.S. Cl. ......... 523/400; 523/220; 523/123; 264/261
(58) Field of Classification Search .................. 523/220, 523/123, 400; 525/123; 264/261
See application file for complete search history.

(56) References Cited

U.S. PATENT DOCUMENTS

| | | | |
|---|---|---|---|
| 4,497,764 A * | 2/1985 | Rey | 264/261 |
| 4,548,961 A * | 10/1985 | Rey | 523/220 |
| 4,578,453 A | 3/1986 | Jackson, Jr. et al. | |
| 4,623,701 A | 11/1986 | Massingill | |
| 4,885,319 A * | 12/1989 | Dougherty et al. | 522/31 |
| 5,073,595 A * | 12/1991 | Almer et al. | 525/65 |
| 5,239,406 A * | 8/1993 | Lynam | 359/275 |
| 5,354,797 A * | 10/1994 | Anderson et al. | 524/285 |
| 5,355,245 A * | 10/1994 | Lynam | 359/267 |
| 5,523,877 A * | 6/1996 | Lynam | 359/275 |
| 5,541,268 A * | 7/1996 | Fenn et al. | 428/431 |
| 5,576,389 A * | 11/1996 | Ueno et al. | 525/119 |
| 5,681,907 A * | 10/1997 | Starner et al. | 525/526 |
| 5,736,620 A | 4/1998 | Earls et al. | |
| 5,864,419 A * | 1/1999 | Lynam | 359/265 |
| 6,122,093 A * | 9/2000 | Lynam | 359/275 |
| 6,548,175 B2 * | 4/2003 | Sachdev et al. | 428/414 |
| 6,645,340 B2 | 11/2003 | Gienau et al. | |
| 6,733,880 B2 * | 5/2004 | Tanabe et al. | 428/355 R |
| 6,806,314 B2 * | 10/2004 | Fenn et al. | 525/123 |
| 6,818,293 B1 | 11/2004 | Keep et al. | |
| 2002/0113925 A1 * | 8/2002 | Higashi | 349/113 |
| 2002/0127406 A1 * | 9/2002 | Sachdev et al. | 428/413 |
| 2003/0062630 A1 * | 4/2003 | Tanabe | 257/783 |
| 2004/0142272 A1 * | 7/2004 | Song et al. | 430/176 |
| 2004/0214984 A1 * | 10/2004 | Keep et al. | 528/359 |
| 2004/0266972 A1 * | 12/2004 | Surjan | 528/124 |
| 2006/0226525 A1 * | 10/2006 | Osuga et al. | 257/685 |
| 2007/0110957 A1 * | 5/2007 | Higashi et al. | 428/141 |
| 2007/0167645 A1 * | 7/2007 | Fies et al. | 560/224 |
| 2007/0291366 A1 * | 12/2007 | Murata et al. | 359/599 |
| 2011/0039982 A1 | 2/2011 | Hefner et al. | |

FOREIGN PATENT DOCUMENTS

| | | |
|---|---|---|
| WO | 2004069892 A1 | 8/2004 |
| WO | 2006029140 A1 | 3/2006 |
| WO | 2007092071 A1 | 8/2007 |

OTHER PUBLICATIONS

Preparation and Properties of UV-Autocurable BTDA-Based Epoxy-Multiacrylate Resins. Effects of the Degree of Polymerization and Epoxy Type, Chiang et al. Journal of Applied Polymer Science, vol. 43, 1827-1836 (1991).*
Mitsubishi Gas Chemical Co., Heat Shrinkable Film, Takashi Hirokane, et al., Abstract of JP2003183422.
Jungk, John S., et al., J. Org. Chem. 1983, 48, 1116-1120, Efficient Synthesis of C-Pivot Lariat Ethers. 2-(alkoxymethyl)-1,4,7,10,13,16-hexaoxacycloocta-decanes, Department of Chemistry, Louisiana State University, Baton Rouge, Louisiana 70803.
Motogami, Kenji, et al., Electrochimica Acta, vol. 37, No. 9, pp. 1725-1727, 1992, Pergamon Press Ltd "A New Polymer Electrolyte Based on Polyglycidylether".
Argyropoulos, J., et al., Unoxol Diol: A New Liquid Cycloaliphatic Dial for Coatings Applications, Paint and Coatings, Industry, Western Trade Publ., Canoga Park, CA, U.S. Jun. 1, 2006, pp. 1-5, XP002432852, ISSN: 0884-3848.
PCT/US2009/042645, International Preliminary Report on Patentability.
PCT/US2009/042645, International Search Report and Written Opinion. PCT/US2009/042645, Response to Written Opinion.
Lee, Henry, et al., Handbook of Epoxy Resins, McGraw-Hll Book Company, Epoxy-Resin Reactive Diluents, pp. 13-9 to 13-18, 1967.

* cited by examiner

*Primary Examiner* — James J Seidleck
*Assistant Examiner* — Peter A Salamon

(57) ABSTRACT

An epoxy resin reactive diluent composition comprises an epoxy resin diluent (A) and a resin compound (B), wherein the epoxy resin diluent (A) comprises a cis, trans-1,3- and -1,4-cyclohexanedimethylether moiety; and wherein the resin compound (B) comprises one or more epoxy resins other than the epoxy resin diluent (A). A curable epoxy resin composition comprises the epoxy resin reactive diluent composition and a curing agent and/or curing catalyst therefore. A cured epoxy resin is prepared by curing the curable epoxy resin composition.

12 Claims, No Drawings

EPOXY RESIN REACTIVE DILUENT COMPOSITIONS

CROSS REFERENCE TO RELATED APPLICATIONS

This is a §371 application of PCT International Patent Application Number PCT/US2009/042645 filed May 4, 2009, and claims priority from provisional application Ser. No. 61/055,239 filed May 22, 2008 which is incorporated herein by reference in its entirety.

BACKGROUND OF THE INVENTION

1. Field of the Invention

The present invention relates to epoxy resin reactive diluent compositions comprising a cis, trans-1,3- and -1,4-cyclohexanedimethylether moiety, and curable epoxy resins comprising the epoxy resin reactive diluent compositions, and cured epoxy resin reactive diluent compositions prepared by processes of curing the curable epoxy resins compositions.

2. Description of Background And Related Art

Conventional epoxy resin reactive diluents and their preparation are known in the art and have been described, for example, by Henry Lee and Kris Neville in *Handbook of Epoxy Resins* published by McGraw Hill, Inc., New York, (1967) on pages 13-9 to 13-18 (1967).

However, there is no disclosure nor suggestion in the prior art that teaches an epoxy resin reactive diluent composition comprising a cis, trans-1,3- and -1,4-cyclohexanedimethylether moiety. There is also no disclosure nor suggestion in the prior art that teaches a curable epoxy resins comprising the epoxy resin reactive diluent compositions, and a cured epoxy resin reactive diluent composition prepared by processes of curing the curable epoxy resins compositions.

SUMMARY OF THE INVENTION

The present invention uses epoxy resins comprising the cis, trans-1,3- and -1,4-cyclohexanedimethylether moiety as epoxy resin reactive diluents to react with conventional epoxy resins (for example, diglycidyl ether of bisphenol A) to produce epoxy resin reactive diluent compositions. The resultant epoxy resin reactive diluent compositions can be blended with curing agents and/or catalysts to form curable epoxy resin compositions. By curing the curable epoxy resin compositions, cured epoxy resins can be obtained.

One aspect of the present invention is directed to an epoxy resin reactive diluent composition comprising an epoxy resin diluent (A) and a resin compound (B), wherein the epoxy resin diluent (A) comprises a cis, trans-1,3- and -1,4-cyclohexanedimethylether moiety, and wherein the resin compound (B) comprises one or more epoxy resins other than the epoxy resin diluent (A).

Another aspect of the present invention is directed to a curable epoxy resin composition comprising the above epoxy resin reactive diluent composition.

A further aspect of the present invention is directed to a cured epoxy resin prepared by a process of curing the above curable epoxy resin composition.

DETAILED DESCRIPTION OF THE INVENTION

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the present invention is not limited to the specific embodiments described below, but rather; the invention includes all alternatives, modifications, and equivalents falling within the true scope of the appended claims.

Unless otherwise stated, a reference to a material, a compound, or a component includes the material, compound, or component by itself, as well as in combination with other materials, compounds, or components, such as mixtures or combinations of compounds.

As used herein, the singular forms "a," "an," and "the" include the plural reference unless the context clearly dictates otherwise.

The present invention provides an epoxy resin reactive diluent composition comprising an epoxy resin diluent (A) and a resin compound (B), wherein the epoxy resin diluent (A) comprises a cis, trans-1,3- and -1,4-cyclohexanedimethylether moiety; and wherein the resin compound (B) comprises one or more epoxy resins other than the epoxy resin diluent (A).

The term "reactive diluent" as used herein refers to a diluent which can be added to a material or a compound (for example, an epoxy resin), to modify properties of the material or the compound including, for example, reduction in viscosity.

As used herein, the term "cis, trans-1,3- and -1,4-cyclohexanedimethylether moiety" means a structure or a blend of chemical structures comprising four geometric isomers, a cis-1,3-cyclohexanedimethylether, a trans-1,3-cyclohexanedimethylether, a cis-1,4-cyclohexanedimethylether, and a trans-1,4-cyclohexanedimethylether, within an epoxy resin. The four geometric isomers are shown in the following structures:

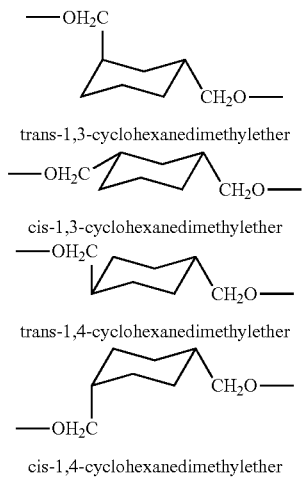

In general, the epoxy resin diluent (A) of the present invention is prepared by a process (for example, an epoxidation reaction process) comprising reacting (a) a mixture of a cis-1,3-cyclohexanedimethanol, a trans-1,3-cyclohexanedimethanol, a cis-1,4-cyclohexanedimethanol, and a trans-1,4-cyclohexanedimethanol (also referred as the cis-1,3- and 1,4-cyclohexanedimethanol) with (b) an epihalohydrin, and (c) a basic acting substance. The process may optionally comprise, (d) a solvent and/or (e) a catalyst. The process may be, for example, a slurry epoxidation process, an anhydrous epoxidation process, or a Lewis acid catalyzed coupling and epoxidation process.

The mixture of the cis, trans-1,3- and 1,4-cyclohexanedimethanol used to prepare the epoxy resin diluent (A) of the present invention may comprise a controlled amount of the cis, trans-1,3-cyclohexanedimethanol, for example, from about 1 percent to about 99 percent, preferably from about 15 percent to about 85 percent, and more preferably from about 40 percent to about 60 percent by weight of the cis, trans-1, 3-cyclohexanedimethanol based on the total weight of the mixture.

A detailed description of the epoxy resins comprising the cis, trans-1,3- and -1,4-cyclohexanedimethylether moiety and the processes for preparing the same is provided in the co-pending U.S. Patent Publication No. US 20110039982 A1, incorporated herein by reference.

It has been discovered, as disclosed in a co-pending U.S. Patent Publication No. US 20110039982 A1 that epoxy resins comprising a cis, trans-1,3- and -1,4-cyclohexanedimethylether moiety have improved 5 properties such as no crystallization at room temperature and lower viscosity compared to epoxy resins comprising a cis, trans-1,4-cyclohexanedimethylether moiety alone. These improved properties increase the ability of the epoxy resins to accept higher solid contents. In addition, some epoxy resins comprising the cis, trans-1,3- and 10-1,4-cyclohexanedimethylether moiety as disclosed in the above co-pending patent application have very low chloride (including ionic, hydrolyzable and total chloride) content and high diglycidyl ether content, which provide the epoxy resins with increased reactivity toward conventional epoxy resin curing agents, reduced potential corrosivity, and improved electrical properties.

The epoxy resin diluent (A) of the present invention comprises a cis, trans-1,3- and -1,4-cyclohexanedimethylether moiety. Preferably, the epoxy resin diluent (A) comprises one of the following epoxy resins:

(1) an epoxy resin comprising a diglycidyl ether of cis-1, 3-cyclohexanedimethanol, a diglycidyl ether of trans-1,3-cyclohexanedimethanol, a diglycidyl ether of cis-1,4-cyclohexanedimethanol, and a diglycidyl ether of trans-1,4-cyclohexanedimethanol (also referred to as diglycidyl ethers of cis, trans-1,3- and 1,4-cyclohexanedimethanol);

(2) an epoxy resin comprising a diglycidyl ether of cis-1, 3-cyclohexanedimethanol, a diglycidyl ether of trans-1,3-cyclohexanedimethanol, a diglycidyl ether of cis-1,4-cyclohexanedimethanol, a diglycidyl ether of trans-1,4-cyclohexanedimethanol, and one or more oligomers thereof;

(3) an epoxy resin comprising a diglycidyl ether of cis-1, 3-cyclohexanedimethanol, a diglycidyl ether of trans-1,3-cyclohexanedimethanol, a diglycidyl ether of cis-1,4-cyclohexanedimethanol, a diglycidyl ether of trans-1,4-cyclohexanedimethanol, a monoglycidyl ether of cis-1,3-cyclohexanedimethanol, a monoglycidyl ether of trans-1,3-cyclohexanedimethanol, a monoglycidyl ether of cis-1,4-cyclohexanedimethanol, and a monoglycidyl ether of trans-1,4-cyclohexanedimethanol; or (4) an epoxy resin comprising a diglycidyl ether of cis-1, 3-cyclohexanedimethanol, a diglycidyl ether of trans-1,3-cyclohexanedimethanol, a diglycidyl ether of cis-1,4-cyclohexanedimethanol, a diglycidyl ether of trans-1,4-cyclohexanedimethanol, a monoglycidyl ether of cis-1,3-cyclohexanedimethanol, a monoglycidyl ether of trans-1,3-cyclohexanedimethanol, a monoglycidyl ether of cis-1,4-cyclohexanedimethanol, a monoglycidyl ether of trans-1,4-cyclohexanedimethanol, and one or more oligomers thereof.

The epoxy resins (3) and (4) above may comprise a controlled amount of the monoglycidyl ether of cis-1,3-cyclohexanedimethanol, monoglycidyl ether of trans-1,3-cyclohexanedimethanol, monoglycidyl ether of cis-1,4-cyclohexanedimethanol, and monoglycidyl ether of trans-1, 4-cyclohexanedimethanol (also referred to as monodiglycidyl ethers of cis, trans-1,3- and 1,4-cyclohexanedimethanol). For example, the amount of the monoglycidyl ethers may be in the range of from about 0.1 percent to about 90 percent by weight; preferably, from about 0.1 percent to about 20 percent by weight; and more preferably, from about 0.1 percent to about 10 percent by weight based on the total weight of the epoxy resin diluent (A).

The resin compound (B) of the present invention comprises one or more epoxy resins other than the epoxy resin diluent (A). The epoxy resin which can be used as the resin compound (B) may be any epoxide-containing compound which has an average of more than one epoxide group per molecule. The epoxide group can be attached to any oxygen, sulfur or nitrogen atom or the single bonded oxygen atom attached to the carbon atom on a —CO—O— group. The oxygen, sulfur, nitrogen atom, or the carbon atom of the —CO—O— group may be attached to an aliphatic, cycloaliphatic, polycycloaliphatic or aromatic hydrocarbon group. The aliphatic, cycloaliphatic, polycycloaliphatic or aromatic hydrocarbon group can be substituted with any inert substituents including, but not limited to, halogen atoms, preferably fluorine, bromine or chlorine; nitro groups; or the groups can be attached to the terminal carbon atoms of a compound containing an average of more than one —(O—CHR$^a$—CHR$^a$)$_t$— group, wherein each R$^a$ is independently a hydrogen atom or an alkyl or haloalkyl group containing from one to two carbon atoms, with the proviso that only one R$^a$ group can be a haloalkyl group, and t has a value from one to about 100, preferably from one to about 20, and more preferably from one to about 10, most preferably from one to about 5.

More specific examples of the epoxy resin suitable for the resin compound (B) include diglycidyl ethers of 1,2-dihydroxybenzene (catechol); 1,3-dihydroxybenzene (resorcinol), 1,4-dihydroxybenzene (hydroquinone), 4,4'-isopropylidenediphenol (bisphenol A), 4,4'-dihydroxydiphenylmethane, 3,3',5,5'-tetrabromobisphenol A, 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,1'-bis(4-hydroxyphenyl)-1-phenylethane; 3,3'-5,5'-tetrachlorobisphenol A; 3,3'-dimethoxybisphenol A; 4,4'-dihydroxybiphenyl; 4,4'-dihydroxy-alpha-methylstilbene; 4,4'-dihydroxybenzanilide; 4,4'-dihydroxystilbene; 4,4'-dihydroxy-alpha-cyanostilbene; N,N'-bis(4-hydroxyphenyl)terephthalamide; 4,4'-dihydroxyazobenzene; 4,4'-dihydroxy-2,2'-dimethylazoxybenzene; 4,4'-dihydroxydiphenylacetylene; 4,4'-dihydroxychalcone; 4-hydroxyphenyl-4-hydroxybenzoate; dipropylene glycol, 1,4-butanediol, neopentyl glycol, poly(propylene glycol), thiodiglycol; the triglycidyl ether of tris(hydroxyphenyl) methane; the polyglycidyl ethers of a phenol or alkyl or halogen substituted phenol-aldehyde acid catalyzed condensation product (novolac resins); the tetraglycidyl amines of 4,4'-diaminodiphenylmethane; 4,4'-diaminostilbene; N,N'-dimethyl-4,4'-diaminostilbene; 4,4'-diaminobenzanilide; 4,4'-diaminobiphenyl; the polyglycidyl ether of the condensation product of a dicyclopentadiene or an oligomer thereof and a phenol or alkyl or halogen substituted phenol; and any combination thereof.

The epoxy resin which can be used as the resin compound (B) may also include an advanced epoxy resin product. The advanced epoxy resin may be a product of an advancement reaction of an epoxy resin with an aromatic di and polyhydroxyl, or carboxylic acid containing compound. The epoxy resin used in the advancement reaction may include any one or more of the aforesaid epoxy resins suitable for the resin compound (B) comprising the di or polyglycidyl ethers.

Examples of the aromatic di and polyhydroxyl or carboxylic acid containing compound include hydroquinone, resorcinol, catechol, 2,4-dimethylresorcinol; 4-chlororesorcinol; tetramethylhydroquinone; bisphenol A; 4,4'-dihydroxydiphenylmethane; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,1-bis(4-hydroxyphenyl)-1-phenylethane; 4,4'-bis (4(4-hydroxyphenoxy)-phenylsulfone) diphenyl ether; 4,4'-dihydroxydiphenyl disulfide; 3,3',3,5'-tetrachloro-4,4'-isopropylidenediphenol; 3,3',3,5'-tetrabromo-4,4'-isopropylidenediphenol; 3,3'-dimethoxy-4,4'-isopropylidenediphenol; 4,4'-dihydroxybiphenyl; 4,4'-dihydroxy-alpha-methylstilbene; 4,4'-dihydroxybenzanilide; bis(4-hydroxyphenyl)terephthalate; N,N'-bis(4-hydroxyphenyl)terephthalamide; bis(4'-hydroxybiphenyl)terephthalate; 4,4'-dihydroxyphenylbenzoate; bis (4'-hydroxyphenyl)-1,4-benzenediimine; 1,1'-bis(4-hydroxyphenyl)cyclohexane; phloroglucinol; pyrogallol; 2,2',5,5'-tetrahydroxydiphenylsulfone; tris(hydroxyphenyl)methane; dicyclopentadiene diphenol; tricyclopentadienediphenol; terephthalic acid; isophthalic acid; 4,4'-benzanilidedicarboxylic acid; 4,4'-phenylbenzoatedicarboxylic acid; 4,4'-stilbenedicarboxylic acid; adipic acid; and any combination thereof.

Preparation of the aforementioned advanced epoxy resin products can be performed using known methods, for example, an advancement reaction of an epoxy resin with one or more suitable compounds having an average of more than one reactive hydrogen atom per molecule, wherein the reactive hydrogen atom is reactive with an epoxide group in the epoxy resin.

The ratio of the compound having an average of more than one reactive hydrogen atom per molecule to the epoxy resin is generally from about 0.01:1 to about 0.95:1, preferably from about 0.05:1 to about 0.8:1, and more preferably from about 0.10:1 to about 0.5:1 equivalents of the reactive hydrogen atom per equivalent of the epoxide group in the epoxy resin.

Examples of the compound having an average of more than one reactive hydrogen atom per molecule include dihydroxyaromatic, dithiol, disulfonamide or dicarboxylic acid compounds or compounds containing one primary amine or amide group, two secondary amine groups, one secondary amine group and one phenolic hydroxy group, one secondary amine group and one carboxylic acid group, or one phenolic hydroxy group and one carboxylic acid group, and any combination thereof.

The advancement reaction may be conducted in the presence or absence of a solvent with the application of heat and mixing. The advancement reaction may be conducted at atmospheric, superatmospheric or subatmospheric pressures and at temperatures of from about 20° C. to about 260° C., preferably, from about 80° C. to about 240° C., and more preferably from about 100° C. to about 200° C.

The time required to complete the advancement reaction depends upon factors such as the temperature employed, the chemical structure of the compound having more than one reactive hydrogen atom per molecule employed, and the chemical structure of the epoxy resin employed. Higher temperature may require shorter reaction time whereas lower temperature may require a longer period of the reaction time.

In general, the time for the advancement reaction completion may range from about 5 minutes to about 24 hours, preferably from about 30 minutes to about 8 hours, and more preferably from about 30 minutes to about 4 hours.

A catalyst may also be added in the advancement reaction. Examples of the catalyst may include phosphines, quaternary ammonium compounds, phosphonium compounds and tertiary amines. The catalyst may be employed in quantities of from about 0.01 percent to about 3 percent, preferably from about 0.03 percent to about 1.5 percent, and more preferably from about 0.05 percent to about 1.5 percent by weight based upon the total weight of the epoxy resin.

Other details concerning an advancement reaction useful in preparing the advanced epoxy resin product for the resin compound (B) which may be employed in the present invention are provided in U.S. Pat. No. 5,736,620 and in *Handbook of Epoxy Resins* by Henry Lee and Kris Neville, incorporated herein by reference.

The epoxy resin reactive diluent composition of the present invention is prepared by mixing the epoxy resin diluent (A) and the resin compound (B), wherein the resin compound (B) comprises one or more epoxy resins other than the epoxy resin diluent (A).

The epoxy resin diluent (A) may be added to the epoxy resin reactive diluent composition in a functionally equivalent amount. For example, the epoxy resin diluent may be added in quantities which will provide the epoxy resin reactive diluent composition with a range of a desired viscosity according to the specific end use intended for the epoxy resin reactive diluent composition.

The desired viscosity is generally controlled by the temperature used for curing the epoxy resin reactive diluent composition, the particular curing catalyst and/or curing agent ultimately to be employed to cure the epoxy resin reactive diluent composition, and the desired ultimate mechanical properties for the cured epoxy resin reactive diluent composition.

For example, if the epoxy resin reactive diluent composition is to be blended with a substantial amount of a filler, then an epoxy resin reactive diluent composition with a lower viscosity is generally required and more epoxy reactive diluent (A) should be added to the epoxy resin reactive diluent composition. However, if the ultimate mechanical properties of the cured epoxy resin diluent composition are desired to be close to that of the cured resin compound (B), then the minimum amount of the epoxy reactive diluent (A) is generally used to reduce the viscosity of the epoxy resin reactive diluent composition.

In general, the epoxy resin diluent (A) may be employed in an amount from about 0.5 percent to about 99 percent, preferably from about 5 percent to about 55 percent, and more preferably from about 10 percent to about 40 percent based upon the total weight of the epoxy reactive diluent composition.

According to the present invention, the curable epoxy resin composition comprises (a) the epoxy resin reactive diluent composition of the present invention, (b) at least one curing agent, (c) and/or at least one curing catalyst.

The term "curable" (also referred to as "thermosettable") means that the composition is capable of being subjected to conditions which will render the composition to a cured or thermoset state or condition.

The term "cured" or "thermoset" is defined by L. R. Whittington in *Whittington's Dictionary of Plastics* (1968) on page 239 as follows: "Resin or plastics compounds which in their final state as finished articles are substantially infusible and insoluble. Thermosetting resins are often liquid at some stage in their manufacture or processing, which are cured by heat, catalysis, or some other chemical means. After being fully cured, thermosets cannot be resoftened by heat. Some plastics which are normally thermoplastic can be made thermosetting by means of crosslinking with other materials."

The curing agent and/or catalyst used for the curable epoxy resin composition may be any curing agents and/or catalysts known for curing epoxy resins.

Examples of the curing agent used in the present invention include aliphatic, cycloaliphatic, polycycloaliphatic or aromatic primary monoamines; aliphatic, cycloaliphatic, polycycloaliphatic or aromatic primary and secondary polyamines; carboxylic acids and anhydrides thereof; aromatic hydroxyl containing compounds; imidazoles; guanidines; urea-aldehyde resins; melamine-aldehyde resins; alkoxylated urea-aldehyde resins; alkoxylated melamine-aldehyde resins; amidoamines; epoxy resin adducts; and any combinations thereof.

Particularly suitable curing agents include, for example, methylenedianiline; 4,4'-diaminostilbene; 4,4'-diamino-alpha-methylstilbene; 4,4'-diaminobenzanilide; dicyandiamide; ethylenediamine; diethylenetriamine; triethylenetetramine; tetraethylenepentamine; urea-formaldehyde resins; melamine-formaldehyde resins; methylolated urea-formaldehyde resins; methylolated melamine-formaldehyde resins; phenol-formaldehyde novolac resins, cresol-formaldehyde novolac resins, sulfanilamide, diaminodiphenylsulfone, diethyltoluenediamine; t-butyltoluenediamine; bis-4-aminocyclohexylamine; isophoronediamine; diaminocyclohexane; hexamethylenediamine; piperazine; aminoethylpiperazine; 2,5-dimethyl-2,5-hexanediamine; 1,12-dodecanediamine; tris-3-aminopropylamine; and any combinations thereof.

Examples of suitable curing catalysts include boron trifluoride, boron trifluoride etherate, aluminum chloride, ferric chloride, zinc chloride, silicon tetrachloride, stannic chloride, titanium tetrachloride, antimony trichloride, boron trifluoride monoethanolamine complex, boron trifluoride triethanolamine complex, boron trifluoride piperidine complex, pyridine-borane complex, diethanolamine borate, zinc fluoroborate, metallic acylates such as stannous octoate or zinc octoate, and any mixtures thereof.

The curing agent may be employed in an amount which will effectively cure the curable epoxy resin composition, however, the amount of the curing agent will also depend upon the particular components present in the curable epoxy resin composition, for example, the epoxy resin diluent (A), the resin compound (B), and the type of curing agent and/or catalyst employed.

Generally, a suitable amount of curing agent may range from about 0.80:1 to about 1.50:1, and preferably from about 0.95:1 to about 1.05:1 equivalents of reactive hydrogen atom in the curing agent per equivalent of epoxide group in the curable epoxy resin composition. The reactive hydrogen atom is the hydrogen atom which is reactive with an epoxide group in the epoxy resin.

Similarly, the curing catalyst is also employed in an amount which will effectively cure the curable epoxy resin composition, however, the amount of the curing catalyst will also depend upon particular components present in the curable epoxy resin composition, for example, the epoxy resin diluent (A), the resin compound (B), and the type of curing agent and/or catalyst employed.

Generally, a suitable amount of the curing catalyst that may be employed in the present invention may be from about 0.0001 percent to about 2 percent, and preferably from about 0.01 percent to about 0.5 percent by weight based on the total weight of the curable epoxy resin composition.

One or more of the curing catalysts may be employed in the process of curing of the curable epoxy resin composition in order to accelerate or otherwise modify the curing process.

The curable epoxy resin composition may also be blended with at least one additive including, for example, a cure accelerator, a solvent, a diluent other than the epoxy resin diluent (A) (including, for example, non-reactive diluents, monoepoxide diluents, epoxy resin diluents other than those comprising a cis, trans-1,3- and -1,4-cyclohexanedimethylether moiety, and reactive non-epoxide diluents), a modifier such as a flow modifier or a thickener, a reinforcing material, a filler, a pigment, a dye, a mold release agent, a wetting agent, a stabilizer, a fire retardant agent, a surfactant, or any combination thereof.

These additives may be added in functionally equivalent amounts, for example, the pigment and/or dye may be added in quantities which will provide the composition with the desired color. In general, the amount of the additives may be from about zero to about 20, preferably from about 0.5 to about 5, and more preferably from about 0.5 to about 3 percent by weight based upon the total weight of the curable epoxy resin composition.

The cure accelerator which can be employed herein includes, for example, mono, di, tri and tetraphenols; chlorinated phenols; aliphatic or cycloaliphatic mono or dicarboxylic acids; aromatic carboxylic acids; hydroxybenzoic acids; halogenated salicylic acids; boric acid; aromatic sulfonic acids; imidazoles; tertiary amines; aminoalcohols; aminopyridines; aminophenols; mercaptophenols; and any mixture thereof.

Particularly suitable cure accelerators include 2,4-dimethylphenol, 2,6-dimethylphenol, 4-methylphenol, 4-tertiarybutylphenol, 2-chlorophenol, 4-chlorophenol, 2,4-dichlorophenol, 4-nitrophenol, 1,2-dihydroxybenzene, 1,3-dihydroxybenzene, 2,2'-dihydroxybiphenyl, 4,4'-isopropylidenediphenol, valeric acid, oxalic acid, benzoic acid, 2,4-dichlorobenzoic acid, 5-chlorosalicylic acid, salicylic acid, p-toluenesulfonic acid, benzenesulfonic acid, hydroxybenzoic acid, 4-ethyl-2-methylimidazole, 1-methylimidazole, triethylamine, tributylamine, N,N-diethylethanolamine, N,N-dimethylbenzylamine, 2,4,6-tris(dimethylamino)phenol, 4-dimethylaminopyridine, 4-aminophenol, 2-aminophenol, 4-mercaptophenol, or any combination thereof.

Examples of the solvent which can be employed herein include, for example, aliphatic and aromatic hydrocarbons, halogenated aliphatic hydrocarbons, aliphatic ethers, aliphatic nitriles, cyclic ethers, glycol ethers, esters, ketones, amides, sulfoxides, and any combination thereof.

Particularly suitable solvents include pentane, hexane, octane, toluene, xylene, methylethylketone, methylisobutylketone, N,N-dimethylformamide, dimethylsulfoxide, diethyl ether, tetrahydrofuran, 1,4-dioxane, dichloromethane, chloroform, ethylene dichloride, methyl chloroform, ethylene glycol dimethyl ether, diethylene glycol methyl ether, dipropylene glycol methyl ether, N-methylpyrrolidinone, N,N-dimethylacetamide, acetonitrile, sulfolane, and any combination thereof.

Examples of the diluent other than the epoxy resin diluent (A) which can be employed herein include, for example, dibutyl phthalate, dioctyl phthalate, styrene, low molecular weight polystyrene, styrene oxide, allyl glycidyl ether, phenyl glycidyl ether, butyl glycidyl ether, vinylcyclohexene oxide, neopentylglycol diglycidyl ether, butanediol diglycidyl ether, hexanediol diglycidyl ether, diethylene glycol diglycidyl ether, dipropylene glycol diglycidyl ether, poly(propylene glycol) diglycidyl ether, thiodiglycol diglycidyl ether, maleic anhydride, ε-caprolactam, butyrolactone, acrylonitrile, and any combination thereof.

Particularly suitable diluents other than the epoxy resin diluent (A) include, for example, the nominally difunctional epoxy resin diluents other than those comprising a cis, trans-1,3- and -1,4-cyclohexanedimethylether moiety such as the aforementioned neopentylglycol diglycidyl ether, butanediol diglycidyl ether, hexanediol diglycidyl ether, diethylene glycol diglycidyl ether, dipropylene glycol diglycidyl ether, poly (propylene glycol) diglycidyl ether, thiodiglycol diglycidyl ether, and any combination thereof.

The modifier such as thickener and flow modifier may be employed in amounts of from zero to about 10, preferably, from about 0.5 to about 6, and more preferably from about 0.5 to about 4 percent by weight based upon the total weight of the curable epoxy resin composition.

The reinforcing material which may be employed herein includes natural and synthetic fibers in the form of woven fabric, mat, monofilament, multifilament, unidirectional fiber, roving, random fiber or filament, inorganic filler or whisker, or hollow sphere. Other suitable reinforcing material includes glass, carbon, ceramics, nylon, rayon, cotton, aramid, graphite, polyalkylene terephthalates, polyethylene, polypropylene, polyesters, and any combination thereof.

The filler which may be employed herein includes, for example, inorganic oxide, ceramic microsphere, plastic microsphere, glass microsphere, inorganic whisker, calcium carbonate, and any combination thereof.

The filler may be employed in an amount of from about zero percent to about 95 percent, preferably from about 10 percent to about 80 percent, and more preferably from about 40 percent to about 60 percent by weight based upon the total weight of the curable epoxy resin composition.

According to the present invention, a cured epoxy resin is prepared by a process of curing the curable epoxy resin composition.

The process of curing of the curable epoxy resin composition of the present invention may be conducted at atmospheric, superatmospheric or subatmospheric pressures and at temperatures of from about 0° C. to about 300° C., preferably from about 25° C. to about 250° C., and more preferably from about 50° C. to about 200° C.

The time required to complete the process of curing the curable epoxy resin composition depends upon the temperature employed. Higher temperature requires shorter curing time whereas lower temperatures require longer curing time. Generally, the process may be completed in about 1 minute to about 48 hours, preferably from about 15 minutes to about 24 hours, and more preferably from about 30 minutes to about 12 hours.

It is also operable to partially cure the curable epoxy resin composition of the present invention to form a B-stage product and subsequently cure the B-stage product completely at a later time.

It has been discovered that the epoxy resin reactive diluent compositions of the present invention possess very low viscosity without the use of solvent and does not exhibit crystallization at room temperature and after prolonged storage time compared to epoxy resin reactive diluents comprising a cis, trans-1,4-cyclohexanedimethanol alone. In addition, some epoxy resin reactive diluent compositions of the present comprising a low chloride (ionic, hydrolyzable and total) form of the epoxy resin reactive diluent, which provide the epoxy resin reactive diluent compositions with increased reactivity toward conventional epoxy resin curing agents, reduced potential corrosivity, and improved electrical properties.

It has also been discovered that the cured epoxy resins of the present invention have specific improvements in physical and mechanical properties compared to cured epoxy resins based on cis, trans-1,4-cyclohexanedimethylether moiety alone. For example, the cured epoxy resins of the present invention have high glass transition temperature, improved moisture and corrosion resistance, and improved coating properties; and are compatible with conventional epoxy resin curing agents.

As shown in the following Examples and Comparative Experiments, the cured epoxy resins comprising the cis, trans-1,4-cyclohexanedimethylether moiety alone (free of oligomer or with oligomer(s)) may have undesirable double glass transition temperatures. However, when the cis, trans-1,3- and 1,4-cyclohexanedimethylether moiety is used to produce the cured epoxy resins of the present invention, no double glass transition temperatures are observed. In addition, the cured epoxy resins of the present invention may have an increased glass transition temperature ranging from about 21.5% to about 48.7% compared to the cured epoxy resins comprising the cis, trans-1,4-cyclohexanedimethylether moiety alone.

As also shown in the following Examples and Comparative Experiments, coatings prepared using the epoxy resin reactive diluent compositions of the present invention may exhibit better coating quality, improved resistance to solvents such as methylethylketone, increased hardness, higher impact resistance and bending resistance, with no loss of adhesion, relative to the corresponding coatings prepared using the epoxy resins comprising the cis, trans-1,4-cyclohexanedimethylether moiety alone.

Applications of the cured epoxy resins may include use in electrical or structural laminate or composite, filament winding, molding, casting, encapsulation, coatings, and the like.

EXAMPLES

Abbreviations

The following standard abbreviations are used in the Examples and Comparative Experiments:
GC=gas chromatography (chromatographic)
GPC=gel permeation chromatography (chromatographic)
DSC=differential scanning calorimetry (calorimetric)
EEW=epoxide equivalent weight
RSD=relative standard deviation
DI=deionized
eq=equivalent
wt=weight(s)
min=minute(s)
hr=hour(s)
mg=milligram(s)
g=gram(s)
mL=milliliter(s)
mm=millimeter(s)
cp=centipoise
CHDM=cis-, trans-1,3- and 1,4-cyclohexanedimethanol
CHDM MGE=monoglycidyl ether of cis, trans-1,3- and 1,4-cyclohexanedimethanol
CHDM DGE=diglycidyl ether of cis, trans-1,3- and 1,4-cyclohexanedimethanol
DGE BPA=diglycidyl ether of bisphenol A The CHDM used in the following Examples and Comparative Experiments was a commercial grade product, UNOXOL™ Diol (manufactured and marketed by The Dow Chemical Company). GC analysis of the CHDM revealed the presence of 99.5 area % (22.3, 32.3, 19.6, and 25.3 area % for the 4 individual isomers) with the 0.5 area % balance comprising a single minor impurity.

The DGE BPA used in the following Examples and Comparative Experiments, was a commercial grade product, D.E.R.™ 331 (manufactured and marketed by The Dow Chemical Company).

D.E.R. and UNOXOL are trademarks of The Dow Chemical Company.

Analytical Equipment and Methods

The following standard analytical equipment and methods are used in the Examples and Comparative Experiments:

Gas Chromatographic (GC) Analysis

A Hewlett Packard 5890 Series II Plus gas chromatograph was employed using a DB-1 capillary column (61.4 M by 0.25 mm, Agilent). The column was maintained in the chromatograph oven at a 50° C. initial temperature. Both the injector inlet and flame ionization detector were maintained at 300° C. Helium carrier gas flow through the column was maintained at 1.1 mL per min. The temperature program employed a two min hold time at 50° C., a heating rate of 10° C. per min to a final temperature of 300° C., and a hold time at 300° C. of 15 min. When a sample was analyzed with oligomers that did not elute from the column, the chromatograph oven was held at 300° C. prior to analysis of the next sample until the residual oligomers had "burned off". All components with retention times greater than that of the 4 isomeric CHDM DGE's were designated as oligomers in the following Examples and Comparative Experiments. The term "free of oligomeric component(s)" or "substantially free of oligomeric component(s)" used herein means that the oligomer is present at less than 2 percent, preferably less than 1 percent, and more preferably zero percent by weight based on the total weight of the epoxy resin product. All GC analyses in the following Examples and Comparative Experiments are measured in area %, and as such are not a quantitative measure of any given component.

Samples for GC analysis were prepared by collection of a 0.5 mL aliquot of an epoxy resin product from the epoxidation process and addition to a vial comprising 1 mL of acetonitrile. A portion of the product in acetonitrile was mixed then loaded into a 1 mL syringe (Norm-Ject, all polypropylene/polyethylene, Henke Sass Wolf GmbH) and passed through a syringe filter (Acrodisc CR 13 with 0.2 µm PTFE membrane, Pall Corporation, Gelman Laboratories) to remove any inorganic salts or debris.

I.C.I. Cone and Plate Viscosity

Viscosity was determined on an I.C.I. Cone and Plate Viscometer (model VR-4540) at 25° C. The viscometer equipped with a 0-5 poise spindle (model VR-4105) and equilibrated to 25° C. was calibrated to zero. A sample was applied to the viscometer and held for 2 minutes, then the viscosity was checked and the reading was taken after 15 seconds. One or more duplicate viscosity tests were completed using a fresh aliquot of the particular product being tested. The individual measurements were averaged.

Gel Permeation Chromatographic (GPC) Analysis

A PL-gel Mixed E pair of columns maintained at 40° C. were used in series along with a differential refractometer detector (Waters 410). Tetrahydrofuran was used as an eluent at a flow rate of 1 mL per min. The injection volume was 100 microliters. A sample was diluted in tetrahydrofuran to a concentration of 0.45-0.50%. Calibration was performed using Polymer Laboratories Polyethylene Glycol Calibrants, PEG 10, Lot 16. RSD for $M_n$, $M_w$, $M_w/M_n$, $M_p$ and $M_z$ was less than 3% and for $M_{z+1}$ RSD was less than 6%. The chromatogram was visually examined and different peak windows were selected for individual integration of the respective peaks. Precision was determined by analyzing the sample in duplicate. The RSD's for $M_p$ (the molecular weight at the apex of the peak) and area % are less than 1% for peak windows greater than 10% of the total area and less than 10% for peak windows less than 10% of the total area. The area percent and peak molecular weights thus obtained were averaged to give the indicated results in the following Examples and Comparative Experiments.

Hydrolyzable, Ionic and Total Chloride Analysis

Hydrolyzable chloride generally results from a coupling product (for example, chlorohydrin intermediate) which has not cyclized via dehydrochlorination with sodium hydroxide to give the epoxide ring during the epoxidation process.

Ionic chloride includes sodium chloride co-product from the epoxidation process which has been entrained in the epoxy resin product. Sodium chloride is co-produced in the dehydrochlorination of a chlorohydrin with sodium hydroxide.

Total chloride accounts for the chlorine bound into the epoxy resin structure in the form of a chloromethyl group. The chloromethyl group forms as a result of a coupling reaction of a secondary hydroxyl group in a chlorohydrin intermediate with epi.

The ionic and hydrolyzable chlorides were determined using titration methods while the total chloride was determined via X-ray fluorescence analysis.

Percent Epoxide/Epoxide Equivalent Weight (EEW) Analysis

A standard titration method was used to determine percent epoxide in the various epoxy resins. A sample was weighed (ranging from about 0.1-0.2 g) and dissolved in dichloromethane (15 mL). Tetraethylammonium bromide solution in acetic acid (15 mL) was added to the sample. The resultant solution was treated with 3 drops of crystal violet solution (0.1% w/v in acetic acid) and was titrated with 0.1N perchloric acid in acetic acid on a Metrohm 665 Dosimat titrator (Brinkmann). Titration of a blank sample comprising dichloromethane (15 mL) and tetraethylammonium bromide solution in acetic acid (15 mL) provided correction for solvent background. General methods for this titration are found in the scientific literature, for example, Jay, R. R., "Direct Titration of Epoxy Compounds and Aziridines", Analytical Chemistry, 36, 3, 667-668 (March, 1964).

Differential Scanning Calorimetry (DSC)

A DSC 2910 Modulated DSC (TA Instruments) was employed, using a heating rate of 7° C. per min from 25° C. to 250° C. under a stream of nitrogen flowing at 45 cubic centimeters per min. Specific sample weights are provided in the following Examples and Comparative Experiments.

The following Examples and Comparative Experiments further illustrate the present invention in detail but are not to be construed to limit the scope thereof.

Example 1

Preparation and Characterization of 10/90 wt. % and 50/50 Wt. % Blends of Oligomer-Free CHDM MGE and CHDM DGE Mixture with DGE BPA and the Cycloaliphatic Diamine Cured Product Thereof GC analysis of an oligomer-free CHDM MGE and CHDM DGE mixture revealed 13.85 area % CHDM MGE (4.11, 2.51, 5.08, and 2.15 area % for the 4 individual isomers), 83.29 area % CHDM DGE (25.57, 29.95, 9.45, and 18.32 area % for the individual isomers), with the balance comprising 2.86 area % of 11 minor impurities. Titration demonstrated 31.66% epoxide (135.93 EEW). Viscosity (25° C.) averaged 36 cp. A commercial grade DGE BPA assayed 23.01% epoxide (187.04 EEW) by titration. Nominal viscosity of the DGE BPA was 12,500 cp (25° C.). Using these components, blends were prepared and characterized as follows:

| CHDM MGE & CHDM DGE Mixture wt % (g) | DGE BPA wt % (g) | % Epoxide (EEW) | Viscosity cp |
|---|---|---|---|
| 10 (0.200) | 90 (1.800) | 24.30 (177.07) | 3097a |
| 50 (1.000) | 50 (1.000) | 27.48 (156.59) | 269b | aAverage of 3190, 3100, and 3000 cp, bAverage of 273, 261, 272, and 271 cp

An aliquot of each of the mixtures was combined with a formulated curing agent comprising less than 36% isophoronediamine, less than 30% benzyl alcohol, and less than 24% other ingredients including 4-tert-butylphenol. The curing agent used was a commercial grade amine product having an active hydrogen eq wt of 120 (Ancamine™ 2423, Air Products and Chemicals, Inc.) DSC analysis completed using a 13.4 mg portion of 10/90 wt % blend and 10.7 and 10.4 mg portions of the 50/50 wt % blend characterized the exothermic cure. The remaining portion of each blend was allowed to cure at room temperature and then postcured for one hr in an oven preheated to 150° C. DSC analysis completed using 31.8 mg and 32.5 mg portions of cured product from the 10/90 wt % blend and 30.7 mg and 29.4 mg portions of cured product from the 50/50 wt % blend gave glass transition temperatures as shown in the following table:

| Mixture wt % composition/ g used | Curing Agent g | Onset ° C. | Maximum ° C. | Enthalpy joules/g | Tg ° C. |
|---|---|---|---|---|---|
| 10:90/0.7508 | 0.509 | 41.3 | 80.3 | 331.9 | 56.3a |
| 50:50/0.9272 | 0.711 | 45.2b | 80.8c | 324.9d | 38.5e | aAverage of 57.9° C. and 54.6° C., bAverage of 46.4° C. and 44.0° C., cAverage of 80.8° C. and 81.5° C., dAverage of 327.62 joules/g and 322.2 joules/g, eAverage of 38.7° C. and 38.3° C.

The cured products from the 10/90 and the 50/50 wt % blends were rigid, light yellow colored, transparent solids.

Comparative Experiment A

Preparation and Characterization of 10/90 And 50/50 Wt. % Blends of Oligomer-Free Mono and Diglycidyl Ethers of cis, trans-1,4-Cyclohexanedimethanol Mixture with DGE BPA and the Cycloaliphatic Diamine Cured Product Thereof GC analysis of an oligomer-free mono and diglycidyl ether of cis, trans-1,4-cyclohexanedimethanol mixture revealed 13.90 area % monoglycidyl ether of cis, trans-1,4-cyclohexanedimethanol (8.37 and 5.53 area % for the 2 individual isomers), 85.55 area % diglycidyl ether of cis, trans-1,4-cyclohexanedimethanol (28.46 and 57.09 area % for the 2 individual isomers), with the balance comprising 0.55 area % of 7 minor impurities. Titration demonstrated 31.45% epoxide (136.83 EEW). Viscosity (25° C.) averaged 36 cp. The commercial grade DGE BPA is described in Example 1. Using these components, blends were prepared and characterized as follows:

| cis,trans-1,4-Mixture wt % (g) | DGE BPA wt % (g) | % Epoxide (EEW) | Viscosity cp |
|---|---|---|---|
| 10 (0.200) | 90 (1.800) | 24.20 (177.80) | 3040a |
| 50 (1.000) | 50 (1.000) | 27.01 (159.29) | 271b | aAverage of 3030 and 3050 cp, bAverage of 270 and 272.5 cp

An aliquot of each of the mixtures was combined with the curing agent described in Example 1. DSC analysis completed using 14.3 and 11.5 mg portions of the 10/90 wt % blend and 12.3 mg and 14.4 mg portions of the 50/50 wt % blend characterized the exothermic cure. The remaining portion of each blend was allowed to cure at room temperature and then postcured for one hr in an oven preheated to 150° C. DSC analysis completed using 28.6 mg and 31.6 mg portions of cured product from the 10/90 wt % blend and 27.4 mg and 26.4 mg portions of cured product from the 50/50 wt % blend gave glass transition temperatures as shown in the following table:

| Mixture wt % composition/ g used | Curing Agent g | Onset ° C. | Maximum ° C. | Enthalpy joules/g | Tg ° C. |
|---|---|---|---|---|---|
| 10:90/0.6111 | 0.412 | 38.3a | 79.7b | 323.4c | 45.94 & 58.75d |
| 50:50/0.6908 | 0.520 | 38.9e | 82.3 f | 319.9g | 32.28 & 40.99h | aAverage of 37.7° C. and 38.8° C., bAverage of 79.2° C. and 80.1° C., cAverage of 321.7 joules/g and 325.0 joules/g, dDouble Tg observed, average of 46.25° C. plus 59.22° C. with 45.62° C. plus 58.27° C., eAverage of 36.9° C. and 40.9° C., fAverage of 82.3° C. and 82.3° C., gAverage of 325.7 joules/g and 314.1 joules/g, hDouble Tg observed, average of 31.00° C. plus 41.99° C. and 33.55° C. plus 39.98° C.

The cured products from the 10/90 and the 50/50 wt % blends were rigid, light yellow colored, transparent solids.

Example 2

Preparation and Characterization of 10/90, 25/75 And 50/50 Wt. % Blends of CHDM MGE and CHDM DGE Mixture Containing Oligomeric Components with DGE BPA and the Cycloaliphatic Diamine Cured Product Thereof

GC analysis of a CHDM MGE and CHDM DGE mixture containing oligomeric components revealed 2.8 area % CHDM MGE (0.6, 0.4, 1.0, and 0.8 area % for the 4 individual isomers), 94.7 area % CHDM DGE (21.9, 34.7, 11.2, and 26.9 area % for the 4 individual isomers), 1.7 area % oligomers (4 minor components), with the balance comprising 3 minor impurities. Titration demonstrated 28.71% epoxide (149.89 EEW). Viscosity (25° C.) averaged 137 cp. The commercial grade DGE BPA is described in Example 1. Using the above components, blends were prepared and characterized as follows:

| CHDM MGE & CHDM DGE Mixture wt % (g) | DGE BPA wt % (g) | % Epoxide (EEW) | Viscosity cp |
|---|---|---|---|
| 10 (0.200) | 90 (1.800) | 23.75 (181.17) | 3750a |
| 25 (0.500) | 75 (1.500) | 24.56 (175.20) | 1923b |
| 50 (1.000) | 50 (1.000) | 26.01 (165.41) | 560c | aAverage of 3800, 3750 and 3700 cp,
bAverage of 1920, 1950 and 1900 cp,
cAverage of 590 and 530 cp An aliquot of each of the mixtures was combined with the curing agent described in Example 1. DSC analysis completed using 11.4 mg and 11.3 mg portions of 10/90 wt % blend, 12.2 and 10.9 mg portions of the 25/75 wt % blend and 13.3 mg and 12.2 mg portions of the 50/50 wt % blend characterized the exothermic cure. The remaining portion of each blend was allowed to cure at room temperature and then postcured for one hr in an oven preheated to 150° C. DSC analysis completed using 31.4 mg and 28.9 mg portions of cured product from the 10/90 wt % blend, 27.9 mg and 30.9 mg portions of cured product from the 25/75 wt % blend and 32.7 mg and 29.1 mg portions of cured product from the 50/50 wt % blend gave glass transition temperatures as shown in the following table:

| Mixture wt % composition/ g used | Curing Agent g | Onset ° C. | Maximum ° C. | Enthalpy joules/g | Tg ° C. |
|---|---|---|---|---|---|
| 10:90/0.7681 | 0.509 | 38.4a | 79.3b | 341.7c | 62.6d |
| 25:75/1.0551 | 0.723 | 37.6e | 80.1f | 342.2g | 47.6h |
| 50:50/1.1372 | 0.825 | 39.7i | 81.1j | 354.1k | 43.1l | aAverage of 37.4 and 39.5° C.,
bAverage of 79.1 and 79.5° C.,
cAverage of 351.4 and 331.9 joules/g,
dAverage of 62.7° C. and 62.4° C.,
eAverage of 38.8 and 36.3° C.,
fAverage of 80.9 and 79.2° C.,
gAverage of 333.3 and 351.0 joules/g,
hAverage of 46.8 and 48.3° C.,
iAverage of 38.9 and 40.5° C.,
jAverage of 81.2 and 81.0° C.,
kAverage of 344.0 and 364.2 joules/g,
lAverage of 42.8 and 43.4° C.

Comparative Experiment B

Preparation and Characterization of 10/90, 25/75 And 50/50 Wt. % Blends of Mono and Diglycidyl Ethers of cis, trans-1,4-Cyclohexanedimethanol Mixture Containing Oligomeric Components with DGE BPA and the Cycloaliphatic Diamine Cured Product Thereof

GC analysis of a mixture of monoglycidyl ether and diglycidyl ether of cis, trans-1,4-cyclohexanedimethanol containing oligomeric components revealed 1.6 area % cis, trans-1,4-cyclohexanedimethanol (0.3 and 1.3 area % for the 2 individual isomers), 7.8 area % monoglycidyl ether of cis, trans-1,4-cyclohexanedimethanol (4.7 and 3.1 area % for the 2 individual isomers), 61.2 area % diglycidyl ether of cis, trans-1,4-cyclohexanedimethanol (19.1 and 42.1 area % for the 2 individual isomers), 29.2 area % oligomers (0.63, 1.35, 1.44, 0.68, 7.20, 17.30, 0.22, 0.21, and 0.20 area % for the 9 individual components), with the 0.2 area % balance as a single impurity. Titration demonstrated 27.05% epoxide (159.05 EEW). Viscosity (25° C.) averaged 69 cp. The ionic and hydrolyzable and total chlorides were analyzed giving 536 ppm hydrolyzable chloride, 21.60 ppm ionic chloride and 2.356% total chloride. GPC analysis provided the following results: $M_n=245$, $M_w=265$, $M_w/M_n=1.08$, $M_p=205$, $M_z=292$, $M_{z+1}=331$. Integration of peak windows of the respective peaks gave the following results:

| Peak Window | Mp | Area % |
|---|---|---|
| A | 205 | 56.1 |
| B | 308 | 33.9 |
| C | 401 | 8.5 |
| D | 400-1000 MW tail | 2.0 |

The commercial grade DGE BPA is described in Example 1. Using the above components, blends were prepared and characterized as follows:

| cis,trans-1,4-Mixture wt % (g) | DGE BPA wt % (g) | % Epoxide (EEW) | Viscosity cp |
|---|---|---|---|
| 10 (0.200) | 90 (1.800) | 23.73 (181.34) | 3625a |
| 25 (0.500) | 75 (1.500) | 24.25 (177.44) | 1610b |
| 50 (1.000) | 50 (1.000) | 25.33 (169.90) | 414c | aAverage of 3650 and 3600 cp,
bAverage of 1600 and 1620 cp,
cAverage of 412.5 and 416.25 cp An aliquot of each of the mixtures was combined with the curing agent described in Example 1. DSC analysis completed using 10.2 mg and 12.5 mg portions of 10/90 wt % blend, 10.5 mg and 10.5 mg portions of 25/75 wt % blend and 12.0 mg and 12.6 mg portions of the 50/50 wt % blend characterized the exothermic cure. The remaining portion of each blend was allowed to cure at room temperature and then postcured for one hr in an oven preheated to 150° C. DSC analysis completed using 29.9 and 32.7 mg portions of cured product from the 10/90 wt % blend, 29.4 mg and 32.2 mg portions of the cured product from the 25/75 wt % blend and 32.2 and 32.8 mg portions of cured product from the 50/50 wt % blend gave glass transition temperatures as shown in the following table:

| Mixture wt % composition/ g used | Curing Agent g | Onset ° C. | Maximum ° C. | Enthalpy joules/g | Tg ° C. |
|---|---|---|---|---|---|
| 10:90/1.1103 | 0.735 | 37.3a | 79.3b | 340.6c | 51.51 & 60.01d |
| 25:75/1.0515 | 0.711 | 39.1e | 80.0f | 343.0g | 46.7h |
| 50:50/0.9900 | 0.699 | 38.9i | 80.2j | 355.7k | 41.4l | aAverage of 38.2 and 36.3° C.,
bAverage of 80.0 and 79.9° C.,
cAverage of 346.4 and 334.8 joules/g,
dDouble Tg observed, average of 51.33° C. plus 61.26° C. and 51.68° C. plus 58.76° C.,
eAverage of 37.3 and 40.9° C.,
fAverage of 82.3 and 82.3° C.,
gAverage of 343.5 and 342.5 joules/g,
hAverage of 46.5° C. and 46.8° C.,
iAverage of 35.8 and 40.0° C.,
jAverage of 80.0 and 80.3° C.,
kAverage of 368.8 and 342.6 joules/g,
lAverage of 41.09° C. and 41.67° C.

The cured products from the 10/90, 25/75 and 50/50 wt % blends were rigid, light yellow colored, transparent solids.

Example 3

Preparation and Characterization of 10/90, 25/75 And 50/50 Wt. % Blends of CHDM MGE and CHDM DGE Mixture Containing Oligomeric Components with DGE BPA and the Polyalkylenepolyamine Cured Product Thereof GC analysis of a CHDM MGE and CHDM DGE mixture containing oligomeric components revealed 3.5 area % CHDM MGE (0.9, 0.5, 1.5, and 0.6 area % for the 4 individual isomers), 90.2 area % CHDM DGE (22.2, 33.1, 10.4, and 24.5 area % for the 4 individual isomers), 5.4 area % oligomers (>22 minor components), with the balance as several minor impurities. Titration demonstrated 30.41% epoxide (141.52 EEW). Viscosity (25° C.) averaged 76 cp. The ionic and hydrolyzable and total chlorides were analyzed giving 83 ppm hydrolyzable chloride, 8.156 ppm ionic chloride and 0.2304% total chloride. GPC analysis provided the following results: $M_n=239$, $M_w=335$, $M_w/M_n=1.41$, $M_p=195$, $M_z=708$, $M_{z+1}=2010$. Integration of peak windows of the respective peaks gave the following results:

| Peak Window | Mp | Area % |
|---|---|---|
| A | 195 | 71.1 |
| B | 326 | 3.5 |
| C | 446 | 13.8 |
| D | 651 | 4.8 |
| E | 830 | 2.4 |
| F | 1000-6500 MW tail | 4.7 |

The commercial grade DGE BPA is described in Example 1. Using the above components, blends were prepared and characterized as follows:

| CHDM MGE & CHDM DGE Mixture wt % (g) | DGE BPA wt % (g) | % Epoxide (EEW) | Viscosity cp |
|---|---|---|---|
| 10 (0.200) | 90 (1.800) | 24.12 (178.41) | 3213.3a |
| 25 (0.500) | 75 (1.500) | 25.01 (172.06) | 1740b |
| 50 (1.000) | 50 (1.000) | 26.86 (160.18) | 533.3c | aAverage of 3150, 3300 and 3190 cp,
bAverage of 1700 and 1780 cp,
cAverage of 520, 510 and 570 cp An aliquot of each of the mixtures was combined with triethylenetetramine as the curing agent. The curing agent used was a commercial grade product having an active hydrogen eq wt of 24.4 (D.E.H.™ 24, The Dow Chemical Company.). DSC analysis completed using 11.8 and 11.8 mg portions of 10/90 wt % blend, 11.3 mg and 12.0 mg portions of 25/75 wt % blend and 10.7 mg and 11.2 mg portions of the 50/50 wt % blend characterized the exothermic cure. The remaining portion of each blend was allowed to cure at room temperature and then postcured for one hr in an oven preheated to 150° C. DSC analysis completed using 31.4 mg, 31.7 mg and 34.6 mg portions of cured product from the 10/90 wt % blend, 28.9 mg and 28.0 mg portions of cured product from the 25/75 wt % blend and 33.0 mg and 31.0 mg portions of cured product from the 50/50 wt % blend gave glass transition temperatures as shown in the following table:

| Mixture wt % composition/ g used | Curing Agent g | Onset ° C. | Maximum ° C. | Enthalpy joules/g | Tg ° C. |
|---|---|---|---|---|---|
| 10:90/1.3385 | 0.183 | 63.3a | 96.3b | 546.8c | 112.2d |
| 25:75/1.0164 | 0.144 | 62.8e | 96.8f | 530.7g | 102.2h |
| 50:50/1.1700 | 0.178 | 67.2i | 101.0j | 601.6k | 83.5l | aAverage of 64.0 and 62.6° C.,
bAverage of 96.6 and 95.9° C.,
cAverage of 553.0 and 540.6 joules/g,
dAverage of 113.9, 111.5 and 111.1° C.,
eAverage of 63.5 and 62.0° C.,
fAverage of 97.3 and 96.2° C.,
gAverage of 506.2 and 555.1 joules/g,
hAverage of 104.0 and 100.4° C.,
iAverage of 65.9 and 68.5° C.,
jAverage of 100.7 and 101.3° C.,
kAverage of 587.0 and 616.1 joules/g,
lAverage of 84.9 and 82.1° C.

The cured products from the 10/90, 25/75 and 50/50 wt % blends were rigid, light yellow colored, transparent solids.

Comparative Experiment C

Preparation and Characterization of 10/90, 25/75 And 50/50 Wt. % Blends of Mono and Diglycidyl Ethers of cis, trans-1,4-Cyclohexanedimethanol Mixture Containing Oligomeric Components with DGE BPA and the Polyalkylenepolyamine Cured Product Thereof The mono and diglycidyl ethers of cis, trans-1,4-cyclohexanedimethanol mixture containing oligomeric components is described in Comparative Experiment B. The commercial grade DGE BPA is described in Example 1. Using the above components, blends were prepared and characterized as follows:

| cis,trans-1,4-Mixture wt % (g) | DGE BPA wt % (g) | % Epoxide (EEW) | Viscosity cp |
|---|---|---|---|
| 10 (0.200) | 90 (1.800) | 23.74 (181.28) | a |
| 25 (0.500) | 75 (1.500) | 24.25 (177.48) | a |
| 50 (1.000) | 50 (1.000) | 25.28 (170.23) | a | a see viscosity data given in Comparative Experiment B

An aliquot of each of the mixtures was combined with the curing agent described in Example 3. DSC analysis completed using 12.5 mg and 10.1 mg portions of 10/90 wt % blend, 10.2 mg and 12.1 mg portions of 25/75 wt % blend and 11.2 mg and 12.4 mg portions of the 50/50 wt % blend characterized the exothermic cure. The remaining portion of each blend was allowed to cure at room temperature and then postcured for one hr in an oven preheated to 150° C. DSC analysis completed using 30.4 and 33.2 mg portions of cured product from the 10/90 wt % blend, 28.9 mg and 29.9 mg portions of the cured product from the 25/75 wt % blend and 33.7 mg and 31.5 mg portions of cured product from the 50/50 wt % blend gave glass transition temperatures as shown in the following table:

| Mixture wt % composition/ g used | Curing Agent g | Onset ° C. | Maximum ° C. | Enthalpy joules/g | Tg ° C. |
|---|---|---|---|---|---|
| 10:90/1.2114 | 0.163 | 62.0a | 95.2b | 534.5c | 109d |
| 25:75/1.3298 | 0.183 | 64.0e | 97.4f | 522.1g | 93.4h |
| 50:50/1.1271 | 0.162 | 60.1i | 96.7j | 559.4k | 56.14 & 72.40l | aAverage of 63.0 and 60.9° C.,
bAverage of 95.5 and 94.9° C.,
cAverage of 534.0 and 534.9 joules/g,
dAverage of 109.1° C. and 108.9° C.,
eAverage of 63.6 and 64.3° C.,
fAverage of 97.3 and 97.5° C.,
gAverage of 544.8 and 499.3 joules/g,
hAverage of 93.0 and 93.7° C.,
iAverage of 58.4 and 61.7° C.,
jAverage of 96.3 and 97.0° C.,
kAverage of 540.9 and 577.9 joules/g,
lDouble Tg observed, average of 55.07° C. plus 73.54° C. and 57.20° C. plus 71.25° C.

The cured products from the 10/90, 25/75 and 50/50 wt % blends were rigid, light yellow colored, transparent solids.

Example 4

Preparation And Characterization of 10/90, 25/75 And 50/50 Wt. % Blends of Oligomer-Free CHDM MGE And CHDM DGE Mixture With DGE BPA And the Polyalkylenepolyamine Cured Product Thereof The oligomer-free CHDM MGE and CHDM DGE mixture and DGE BPA are described in Example 1. Using the above components, blends were prepared and characterized as follows:

| CHDM MGE & CHDM DGE Mixture wt % (g) | DGE BPA wt % (g) | % Epoxide (EEW) | Viscosity cp |
|---|---|---|---|
| 10 (0.200) | 90 (1.800) | 24.23 (177.61) | a |
| 25 (0.500) | 75 (1.500) | 25.32 (169.93) | — |
| 50 (1.000) | 50 (1.000) | 27.39 (157.08) | a | a see viscosity data given in Example 1

An aliquot of each of the mixtures was combined with the curing agent described in Example 3. DSC analysis completed using 10.9 mg and 10.4 mg portions of 10/90 wt % blend, 10.0 and 9.9 mg portions of the 25/75 wt % blend and 10.0 mg and 11.8 mg portions of the 50/50 wt % blend characterized the exothermic cure. The remaining portion of each blend was allowed to cure at room temperature and then postcured for one hr in an oven preheated to 150° C. DSC analysis completed using 31.6 mg and 28.0 mg portions of cured product from the 10/90 wt % blend, 33.4 mg and 31.9 mg portions of cured product from the 25/75 wt % blend and 31.8 mg and 31.9 mg portions of cured product from the 50/50 wt % blend gave glass transition temperatures as shown in the following table:

| Mixture wt % composition/ g used | Curing Agent g | Onset ° C. | Maximum ° C. | Enthalpy joules/g | Tg ° C. |
|---|---|---|---|---|---|
| 10:90/1.2607 | 0.173 | 59.9a | 94.1b | 553.8c | 108.4d |
| 25:75/1.2519 | 0.180 | 61.3e | 95.3f | 599.0g | 103.9h |
| 50:50/1.4527 | 0.226 | 61.2i | 96.4j | 604.5k | 71.3l | aAverage of 60.1 and 59.6° C.,
bAverage of 94.1 and 94.1° C.,
cAverage of 563.2 and 544.3 joules/g,
dAverage of 108.8 and 108.0° C.,
eAverage of 62.1 and 60.5° C.,
fAverage of 96.0 and 94.5° C.,
gAverage of 600.7 and 597.2 joules/g,
hAverage of 102.3 and 105.5° C.,
iAverage of 60.2 and 62.1° C.,
jAverage of 96.1 and 96.6° C.,
kAverage of 586.3 and 622.7 joules/g,
lAverage of 71.0 and 71.6° C.

The cured products from the 10/90, 25/75 and 50/50 wt % blends were rigid, light yellow colored, transparent solids.

Comparative Experiment D

Preparation and Characterization of 10/90, 25/75 And 50/50 Wt. % Blends of Oligomer-Free Mono and Diglycidyl Ethers of cis, trans-1,4-Cyclohexanedimethanol Mixture with DGE BPA and the Polyalkylenepolyamine Cured Product Thereof The monoglycidyl and diglycidyl ether of cis, trans-1,4-cyclohexanedimethanol mixture containing oligomeric components is described in Comparative Experiment A. The commercial grade DGE BPA is described in Example 1. Using the above components, blends were prepared and characterized as follows:

| cis,trans-1,4-Mixture wt % (g) | DGE BPA wt % (g) | % Epoxide (EEW) | Viscosity cp |
|---|---|---|---|
| 10 (0.200) | 90 (1.800) | 24.33 (176.85) | a |
| 25 (0.500) | 75 (1.500) | 25.20 (170.77) | — |
| 50 (1.000) | 50 (1.000) | 27.38 (157.14) | a | a see viscosity data given in Comparative Experiment A

An aliquot of each of the mixtures was combined with the curing agent described in Example 3. DSC analysis completed using 10.7 mg and 12.8 mg portions of 10/90 wt % blend, 10.5 mg and 12.8 mg portions of 25/75 wt % blend and 11.7 mg and 12.9 mg portions of the 50/50 wt % blend characterized the exothermic cure. The remaining portion of each blend was allowed to cure at room temperature and then postcured for one hr in an oven preheated to 150° C. DSC analysis completed using 33.6 mg and 30.4 mg portions of cured product from the 10/90 wt % blend, 29.6 mg and 32.9 mg portions of the cured product from the 25/75 wt % blend and 30.7 and 26.5 mg portions of cured product from the 50/50 wt % blend gave glass transition temperatures as shown in the following table:

| Mixture wt % composition/ g used | Curing Agent g | Onset ° C. | Maximum ° C. | Enthalpy joules/g | Tg ° C. |
|---|---|---|---|---|---|
| 10:90/1.5041 | 0.208 | 60.7a | 94.1b | 527.2c | 109.4d |
| 25:75/1.5430 | 0.221 | 61.0e | 94.9f | 557.8g | 97.4h |
| 50:50/1.4880 | 0.231 | 60.1i | 95.5j | 604.2k | 56.31 & 77.62l | aAverage of 60.5 and 60.8° C.,
bAverage of 94.4 and 93.7° C.,
cAverage of 506.5 and 547.8 joules/g,
dAverage of 108.9 and 109.8° C.,
eAverage of 60.9 and 61.0° C.,
fAverage of 94.6 and 95.2° C.,
gAverage of 536.9 and 578.6 joules/g,
hAverage of 97.1 and 97.6° C.,
iAverage of 58.7 and 61.4° C.,
jAverage of 94.8 and 96.1° C.,
kAverage of 594.0 and 614.3 joules/g,
lDouble Tg observed, average of 55.85° C. plus 75.79° C. and 56.77° C. plus 79.45° C.

The cured products from the 10/90, 25/75 and 50/50 wt % blends were rigid, light yellow colored, transparent solids.

Example 5

Preparation and Characterization of a 25/75 Wt. % Blend of CHDM MGE and CHDM DGE Containing Oligomeric Components with DGE BPA and the Carboxylic Acid Anhydride Cured Product Thereof The CHDM MGE and CHDM DGE mixture containing oligomeric components is described in Example 3. The commercial grade DGE BPA is described in Example 1. Using the above components, a blend was prepared and characterized as follows:

| CHDM MGE & CHDM DGE Mixture wt % (g) | DGE BPA wt % (g) | % Epoxide (EEW) |
|---|---|---|
| 25 (0.500) | 75 (1.500) | 25.04 (171.85) |

An aliquot of the mixture was combined with curing agent and catalyst. The curing agent used was a commercial grade hexahydro-4-methylphthalic anhydride product having a molecular wt of 168.19 Likewise, the curing catalyst used was a commercial grade diethylaminoethanol product having a molecular wt of 117.19. DSC analysis completed using 11.0 mg and 12.2 mg portions of the blend characterized the exothermic cure. The remaining portion of each blend was allowed to cure at room temperature and then postcured for one hr in an oven preheated to 150° C. DSC analysis completed using 30.4 mg, 30.7 mg and 30.4 mg portions of cured product gave the glass transition temperature as showing in the following table:

| Mixture wt % composition/ g used | Curing Agent/ Catalyst g | Onset ° C. | Maximum ° C. | Enthalpy joules/g | Tg ° C. |
|---|---|---|---|---|---|
| 25:75/1.4988 | 1.3055/ 0.0076 | 128.5a | 149.2b | 318.7c | 116.5d | aAverage of 128.7 and 128.3° C.,
bAverage of 149.4 and 148.9° C.,
cAverage of 294.1 and 343.3 joules/g,
dAverage of 112.8, 119.9 and 116.7° C.

The cured product was a rigid, yellow colored, transparent solid.

Comparative Experiment E

Preparation and Characterization of A 25/75 Wt. % Blend of cis, trans-1,4-Cyclohexanedimethanol Mono and Diglycidyl Ether Containing Oligomeric Components with DGE BPA and the Carboxylic Acid Anhydride Cured Product Thereof The monoglycidyl and diglycidyl ether of cis, trans-1,4-cyclohexanedimethanol mixture containing oligomeric components is described in Comparative Experiment A. The commercial grade DGE BPA is described in Example 1. Using the above components, a blend was prepared and characterized as follows:

| cis,trans-1,4-Mixture wt % (g) | DGE BPA wt % (g) | % Epoxide (EEW) |
|---|---|---|
| 25 (0.500) | 75 (1.500) | 24.13 (178.32) |

An aliquot of the mixture was combined with curing agent and catalyst described in Example 5. DSC analysis completed using 9.5 mg and 9.5 mg portions of the blend characterized the exothermic cure. The remaining portion of each blend was allowed to cure at room temperature and then postcured for one hr in an oven preheated to 150° C. DSC analysis completed using 28.7 mg and 26.6 mg portions of cured product gave the glass transition temperature as shown in the following table:

| Mixture wt % composition/ g used | Curing Agent/ Catalyst g | Onset ° C. | Maximum ° C. | Enthalpy joules/g | Tg ° C. |
|---|---|---|---|---|---|
| 25:75/1.6110 | 1.3523/ 0.0080 | 132.6a | 154.27b | 283.5c | 106.4d | aAverage of 132.5 and 132.6° C.,
bAverage of 154.37 and 154.17° C.,
cAverage of 293.1 and 273.8 joules/g,
dAverage of 108.0 and 104.8° C.

The cured product was a rigid, yellow colored, transparent solid.

Example 6

Preparation and Characterization of Solvent Borne Coatings Using a 25/75 Wt % Blend of CHDM MGE and CHDM DGE Containing Oligomeric Components with DGE BPA and Triethylenetetramine Curing Agent Coatings Formulations A 60% wt solids coating formulation was prepared by mixing 3.4126 g (25 wt %) of CHDM MGE and CHDM DGE containing oligomeric components described in Example 2 with 10.2377 g of DGE BPA described in Example 1. The 13.6503 g of the blend was combined with 10.3930 g of ethylene glycol monobutyl ether and cyclohexanone (80/20 volume %) and 2 drops of a solvent solution of a polyester modified polydimethylsiloxane surface modifier (BYK 310 "Surface Modifier", BYK Chemie USA). Triethylenetetramine curing agent (1.9392 g) described in Example 3 was added to the aforementioned solution and thoroughly mixed therein immediately before preparation of coatings.

A 75% wt solids coating formulation was prepared by mixing 4.9534 g (25 wt %) of CHDM MGE and CHDM DGE containing oligomeric components from Example 2 with 14.8601 g of DGE BPA described in Example 1. The 19.8135 g of the blend was combined with 7.5428 g of ethylene glycol monobutyl ether and cyclohexanone (80/20 volume %) and 2 drops of the solvent solution of polyester modified polydimethylsiloxane surface modifier. Triethylenetetramine curing agent (2.8148 g) described in Example 3 was added to the aforementioned solution and thoroughly mixed therein immediately before preparation of coatings.

Coatings Preparation

The 60% wt solids formulation and a #28 drawdown bar were used to coat three 11 inch by 5 inch by 0.0089 gauge tin-free steel panels. Likewise, the 75% wt solids formulation and a #28 drawdown bar were used to coat three 11 inch by 5 inch by 0.0089 gauge tin-free steel panels. Before application of the coating formulation, each panel was double washed with acetone then placed in an oven maintained at 100° C. for 5 min followed by cooling to room temperature before use. After holding the coated panels for 16 hr at room temperature, they were placed into a forced air convection type oven maintained at 50° C. and held therein for 2 hr to provide transparent, tack-free coatings. Further postcuring was completed by holding the panels at 100° C. for 2 hr followed by holding the panels at 150° C. for one hr.

The 75% wt. solids formulation and a #48 drawdown bar were used to coat three 12 inch by 4 inch by 0.032 inch cold roll steel panels. Before application of the coating formulation, each panel was double washed with acetone then placed in an oven maintained at 100° C. for 5 min followed by cooling to room temperature before use. After holding the coated panels for 16 hr at room temperature, they were placed into a forced air convection type oven maintained at 50° C. and held therein for 2 hr to provide transparent, tack-free coatings. Further postcuring was completed by holding the panels at 100° C. for 2 hr followed by holding the panels at 150° C. for one hr. The coated panels thus obtained had the slight blushing typically observed using a polyalkylenepolyamine curing agent.

Coatings Characterization

A Fisherscope Multi 650C T3.3/GA1.3 film thickness tester was used to test the thickness of each panel. Before using, the instrument was checked for calibration using thickness standards and was found to be in specification. A series of 10 readings were taken across the face of each panel. The average thickness of the three respective panels prepared using the 60% wt. solids formulation was: 1.018 mil+/−0.030 mil, 1.042 mil+/−0.031 mil, and 1.098 mil+/−0.050 mil. The average thickness of the three respective panels prepared using the 75% wt. solids formulation was: 1.344 mil+/−0.131 mil, 1.380 mil+/−0.035 mil, and 1.274 mil+/−0.030 mil. Each panel was trimmed by ½ inch on all four sides, then cut into a 2 inch by 4 inch coupon with the remainder cut into 1½ inch by 4 inch coupons. A 2 inch by 4 inch coupon from each panel was tested for 100 double rubs using the Methylethylketone Double Rubs Test, ASTM D 4752-87 (5402). A 2 inch by 4 inch coupon from each test panel was tested for Film Hardness by Pencil Test, ASTM D 3363-74. A guide for keeping the pencils at the proper angle was employed.

The average thickness of the three respective panels prepared using the 75% wt solids formulation on the cold roll steel panels was: 2.162 mil+/−0.061 mil, 2.135 mil +/−0.089 mil, and 2.025 mil+/−0.081 mil. Each panel was cut in half to provide two coupons. One coupon from each panel was tested using the Effect of Rapid Deformation (Impact) Test ASTM D 2794-90 using a Gardner impact tester with a 4 lb. wt with the capacity to apply 160 in-lbs. Testing was done in both the forward (impact applied on coated side) and reverse (impact applied on uncoated side) directions. The second coupon from each panel was tested using the Modified ⅛" Conical Mandrel Bend Test ASTM D 522-93a, Method A (adapted). An unused corner section of each coupon from the mandrel bend test was tested using the Adhesion Tape Test ASTM D 3359-90—Test Method B—Cross-cut Tape Test. An 11 blade knife was used to cut the panel so as to produce 3 cross-hatched sections. An optical microscope was used to examine the tested panels. The following results were obtained:

| Coatings Test Method | Best Coatings Test Result Achieved |
| --- | --- |
| 100 MEK Double Rubs | no effect1/no effect2 |
| Pencil Hardness | 5H1,2 |
| Forward/Reverse Impact | 160/20 in-lbs2 |
| ⅛" Conical Mandrel Bend | 5 mm2,3 |
| Cross-cut Adhesion | 5B2,4 |

1using 60 wt % solids formulation,
2using 75 wt % solids formulation,
3distance of cracking of the coating measured from the small end of the mandrel,
45B designates "no failure"

Comparative Experiment F

Preparation and Characterization of Solvent Borne Coatings Using a 25/75 Wt % Blend of Cis, Trans-1,4-Cyclohexanedimethanol Mono and Diglycidyl Ether Containing Oligomeric Components with DGE BPA and Triethylenetetramine Curing Agent Coatings Formulations A 60% wt solids coating formulation was prepared by mixing 3.3895 g (25 wt %) of cis, trans-1,4-cyclohexanedimethanol mono and diglycidyl ether containing oligomeric components described in Comparative Experiment B with 10.1686 g of DGE BPA described in Example 1. Titration of an aliquot of the blend demonstrated 24.41% epoxide (176.26 EEW). A 13.1291 g portion of the blend was combined with 9.9644 g of ethylene glycol monobutyl ether and cyclohexanone (80/20 volume %) and 2 drops of a solvent solution of a polyester modified polydimethylsiloxane surface modifier (BYK 310 "Surface Modifier", BYK Chemie USA). Triethylenetetramine curing agent (1.8175 g) described in Example 3 was added to the aforementioned solution and thoroughly mixed therein immediately before preparation of coatings.

A 75% wt solids coating formulation was prepared by mixing 4.9559 g (25 wt %) of cis, trans-1,4-cyclohexanedimethanol mono and diglycidyl ether containing oligomeric components described in Comparative Experiment B with 14.8677 g of DGE BPA described in Example 1. The 19.8236 g of the blend was combined with 7.5226 g of ethylene glycol monobutyl ether and cyclohexanone (80/20 volume %) and 2 drops of the solvent solution of polyester modified polydimethylsiloxane surface modifier. Triethylenetetramine curing agent (2.7442 g) described in Example 3 was added to the aforementioned solution and thoroughly mixed therein immediately before preparation of coatings.

Coatings Preparation

The 60 and 75% wt solids formulations were used to coat tin-free steel panels as described in Example 6. The coated panels thus obtained had the slight blushing typically observed using a polyalkylenepolyamine curing agent. Additionally, the approximate 0.5 inch border of each panel was discolored giving an amber color in contrast to the transparent coating obtained within the panel.

Coatings Characterization

The coated panels were tested as described in Example 6. The average thickness of the three respective panels prepared using the 60% wt. solids formulation was: 1.018 mil+/−0.030 mil, 1.042 mil+/−0.031 mil, and 1.098 mil+/−0.050 mil. The average thickness of the three respective panels prepared using the 75% wt. solids formulation was: 1.344 mil+/−0.131 mil, 1.380 mil+/−0.035 mil, and 1.274 mil+/−0.030 mil. The average thickness of the three respective panels prepared using the 75% wt solids formulation on the cold roll steel panels was: 2.162 mil+/−0.061 mil, 2.135 mil+/−0.089 mil, and 2.025 mil+/−0.081 mil. The following results were obtained:

| Coatings Test Method | Best Coatings Test Result Achieved |
|---|---|
| 100 MEK Double Rubs | no effect1/slight mar2 |
| Pencil Hardness | 3H1,2 |
| Forward/Reverse Impact | 160/10 in-lbs2 |
| 1/8" Conical Mandrel Bend | 8 mm2,3 |
| Cross-cut Adhesion | 5B2,4 |

1using 60 wt % solids formulation,
2using 75 wt % solids formulation,
3distance of cracking of the coating measured from the small end of the mandrel,
45B designates "no failure"

Example 7

A. Preparation and Characterization of a Clear, Unfilled Casting Using a 25/75 Wt % Blend of CHDM MGE and CHDM DGE Containing Oligomeric Components with DGE BPA and a Polyamide Curing Agent A master batch was prepared by mixing 50.00 g (25 wt %) of CHDM MGE and CHDM DGE containing oligomeric components from Example 2 with 150.00 g of DGEBPA. The diglycidyl ether of bisphenol A used was a commercial grade product containing 23.383% epoxide (184.02 EEW) by titration. Titration of an aliquot of the blend demonstrated 25.17% epoxide (170.97 EEW).

A portion (22.00 g, 0.1287 epoxide eq) of the aforementioned master batch blend was combined with a polyamide curing agent (14.67 g, 0.1287 amine hydrogen eq) which was thoroughly mixed therein immediately before preparation of the casting. The curing agent used was a commercial grade product with a nominal amine hydrogen eq wt of 114 (Ancamide™ 2353, Air Products and Chemicals, Inc.). The homogeneous mixture was placed under a bell jar and vacuum applied to remove all gas bubbles before preparing the casting. The degassed mixture was poured into a mold, then maintained at room temperature for the next 16 hr to give an ambient temperature cure. The mold used consisted of two 6 inch by 6 inch aluminum plates. The face of each plate was covered with a 6 inch by 6 inch aluminum sheet coated with a siloxazane polymer. A "U"-shaped 1/8 inch spacer frame and a "U"-shaped interior gasket were positioned between the two aluminum mold release sheets. The gasket was formed from a copper wire encased in silastic rubber tubing. The mold was held together with a series of compression clamps. The ambient temperature cured casting was post cured in the mold using the following schedule: (a) place the mold into an oven maintained at 50° C. and hold therein for 30 min, (b) increase the oven temperature setting to 100° C. (requires 16-20 min to achieve 100° C.), (c) hold at 100° C. for 60 min, (d) remove from 100° C. oven and place the mold into an oven maintained at 150° C., (e) hold at 150° C. for 60 min, (f) remove mold and allow to cool to room temperature, (g) demold casting once cooled to room temperature.

The postcured, transparent, light yellow colored casting was cut to provide five 2.5 inch by 0.5 inch flexural test pieces using a wet saw (Micro-matic Precision Slicing and Dicing Machine, model number WMSA.1015, equipped with a Digital Measuring Display Dynamics Research Corporation, Model 700 12DO). Before testing, the test pieces were held in a constant temperature and humidity room for 40 hr at 73.4+/−3.6° F. and 50+/−5% relative humidity. Testing was completed in accordance with ASTM D 790 using an Instron 4505 giving flexural strength and flexural modulus. DSC analysis completed using 32.1 mg, 28.6 mg and 27.2 mg portions of the cured casting gave glass transition temperatures shown in the table at the end of Example 7.

B. Preparation and Characterization of a Clear, Unfilled Casting Using a 25/75 Wt % Blend of CHDM MGE and CHDM DGE Containing Oligomeric Components with DGE BPA and a Modified Cycloaliphatic Amine Curing Agent A portion (22.00 g, 0.1287 epoxide eq) of the master batch blend described in Example 7 Part A above combined with a modified cycloaliphatic amine curing agent (14.54 g, 0.1287 amine hydrogen eq) were used to prepare a casting. The curing agent used was a commercial grade product with a nominal amine hydrogen eq wt of 113 (Ancamine™ 1618, Air Products and Chemicals, Inc.). The casting was prepared, cured, postcured, with test pieces prepared and tested for flexural properties using the method of Part A above. DSC analysis completed using 32.1 mg and 32.8 mg portions of the cured casting gave glass transition temperatures shown in the table at the end of Example 7.

C. Preparation And Characterization of A Clear, Unfilled Casting Using A 25/75 Wt./Wt. % Blend of CHDM MGE And CHDM DGE Containing Oligomeric Components With DGE BPA And A Phenalkamine Curing Agent A portion (20.00 g, 0.1170 epoxide eq) of the master batch blend from Example 7 Part A. above combined with a phenalkamine curing agent (14.62 g, 0.1170 amine hydrogen eq) were used to prepare a casting. The curing agent used was a commercial grade product with a nominal amine hydrogen eq wt of 125 (Cardolite® NC 541 LV, Cardolite Corporation). The casting was prepared, cured, postcured, with test pieces prepared and tested for flexural properties using the method of Part A above. DSC analysis completed using 32.2 mg and 27.4 mg portions of the cured casting gave glass transition temperatures shown in the table at the end of Example 7.

D. Preparation and Characterization of a Clear, Unfilled Casting Using a 25/75 Wt % Blend of CHDM MGE and CHDM DGE Containing Oligomeric Components with DGE BPA and a Polyalkylenepolyamine Curing Agent A portion (35.00 g, 0.2047 epoxide eq) of the master batch blend from Example 7 Part A above combined with triethylenetetramine curing agent (5.00 g, 0.2047 amine hydrogen eq) were used to prepare a casting. The curing agent used was a commercial grade product with a nominal amine hydrogen eq wt of 24.4 (D.E.H.™ 24). The casting was prepared, cured, postcured, with test pieces prepared and tested for flexural properties using the method of Part A above. DSC analysis completed using 33.7 mg and 34.0 mg portions of the cured casting gave glass transition temperatures shown in the following table.

| Casting | Flexural Strength psi | Flexural Modulus psi | Tg °C. |
|---|---|---|---|
| Example 7 Part A | 13,040 +/− 247 | 443,612 +/− 22,872 | 48.8a |
| Example 7 Part B | 10,112 +/− 18 | 376,474 +/− 3593 | 48.91b |
| Example 7 Part C | 8620 +/− 62 | 263,062 +/− 3262 | 53.24c |
| Example 7 Part D | 14,269 +/− 175 | 423,290 +/− 6820 | 102.99d | aAverage of 49.60, 48.17 and 48.63° C., no residual cure energy observed
bAverage of 48.73 and 49.08° C., no residual cure energy observed
cAverage of 53.59 and 52.88° C., no residual cure energy observed
dAverage of 102.87 and 103.10° C., no residual cure energy observed Comparative Experiment G A. Preparation and Characterization of a Clear, Unfilled Casting Using a 25/75 Wt % Blend of Cis, Trans-1,4-Cyclohexanedimethanol Mono and Diglycidyl Ether Containing Oligomeric Components with DGE BPA and a Polyamide Curing Agent A master batch was prepared by mixing 50.00 g (25 wt. %) of cis, trans-1,4-cyclohexanedimethanol mono and diglycidyl ether containing oligomeric components from Comparative Experiment B with 150.00 g of a DGEBPA. The DGEBPA is described in Example 7 Part A. Titration of an aliquot of the blend demonstrated 24.323% epoxide (176.91 EEW).

A portion (25.00 g, 0.1413 epoxide eq) of the aforementioned master batch blend combined with the polyamide curing agent (14.62 g, 0.1170 amine hydrogen eq) described in Example 7 Part A. were used to prepare a casting. The casting was prepared, cured, postcured, with test pieces prepared and tested for flexural properties using the method of Example 7 Part A. This formulation could not be cast without dispersed bubbles. This was due to the relatively high initial viscosity of the formulation making it impossible to fully degas before pouring the casting. DSC analysis completed using 31.3 mg and 32.5 mg portions of the cured casting gave glass transition temperatures shown in the table at the end of Comparative Experiment G.

In a further attempt to prepare a bubble-free casting, the portion of the master batch blend and the curing agent were separately heated to 50° C. before combining together. This provided a substantially reduced viscosity, however, the formulation appeared to produce bubbles during vacuum degassing. The formulation built viscosity during continued degassing and eventually became too viscous for casting while still continuing to generate bubbles.

B. Preparation and Characterization of a Clear, Unfilled Casting Using a 25/75 Wt % Blend of cis, trans-1,4-Cyclohexanedimethanol Mono and Diglycidyl Ether Containing Oligomeric Components with DGE BPA and a Modified Cycloaliphatic Amine Curing Agent A portion (25.00 g, 0.1413 epoxide eq) of the master batch blend from Part A above was combined with a modified cycloaliphatic amine curing agent (15.97 g, 0.1413 amine hydrogen eq) described in Example 7 Part B. The casting was prepared, cured, postcured, with test pieces prepared and tested for flexural properties using the method of Example 7 Part A. DSC analysis completed using 32.8 mg and 31.5 mg portions of the cured casting gave glass transition temperatures shown in the table at the end of Comparative Experiment G.

C. Preparation and Characterization of a Clear, Unfilled Casting Using a 25/75 Wt./Wt. % Blend of cis, Trans-1,4-Cyclohexanedimethanol Mono and Diglycidyl Ether Containing Oligomeric Components with DGE BPA and a Phenalkamine Curing Agent A portion (25.00 g, 0.1413 epoxide eq) of the master batch blend from Comparative Experiment G Part A above was combined with a phenalkamine curing agent (17.66 g, 0.1413 amine hydrogen eq) described in Example 7 Part C. The casting was prepared, cured, postcured, with test pieces prepared and tested for flexural properties using the method of Example 7 Part A. DSC completed using 33.8 mg and 28.9 mg portions of the cured casting gave glass transition temperatures shown in the table at the end of Comparative Experiment G.

D. Preparation and Characterization of a Clear, Unfilled Casting Using a 25/75 Wt./Wt. % Blend of cis, trans-1,4-Cyclohexanedimethanol Mono and Diglycidyl Ether Containing Oligomeric Components with DGE BPA and a Polyalkylenepolyamine Curing Agent A portion (35.00 g, 0.1978 epoxide eq) of the master batch blend from Comparative Experiment G Part A above was combined with triethylenetetramine curing agent (4.83 g, 0.19795 amine hydrogen eq) described in Example 7 Part D. The casting was prepared, cured, postcured, with test pieces prepared and tested for flexural properties using the method of Example 7 Part A. DSC completed using 32.7 mg and 31.5 mg portions of the cured casting gave glass transition temperatures shown in the table at the end of Comparative Experiment G.

E. Preparation and Characterization of a Clear, Unfilled Casting Using DGE BPA and a Polyalkylenepolyamine Curing Agent A portion (35.00 g, 0.1902 epoxide eq) of DGE BPA described in Example 7 Part A was combined with triethylenetetramine curing agent (4.64 g, 0.1902 amine hydrogen eq) described in Example 7 Part D. The casting was prepared, cured, postcured, with test pieces prepared and tested for flexural properties using the method of Example 7 Part A. DSC completed using 32.3 mg and 33.7 mg portions of the cured casting gave glass transition temperatures shown in the following table.

| Casting | Flexural Strength psi | Flexural Modulus psi | Tg °C. |
|---|---|---|---|
| Comparative Experiment G Part A | 12,710 +/− 131 | 396,334 +/− 7639 | 47.72a |
| Comparative Experiment G Part B | 9857 +/− 50 | 364,996 +/− 2891 | 47.35b |
| Comparative Experiment G Part C | 8625 +/− 131 | 271,425 +/− 6278 | 50.77c |
| Comparative Experiment G Part D | 14,943 +/− 118 | 436,271 +/− 4965 | 97.11d |
| Comparative Experiment G Part E | 14,911 +/− 95 | 440,840 +/− 3145 | 124.48e | aAverage of 47.19 and 48.24° C., no residual cure energy observed
bAverage of 47.82 and 46.87° C., no residual cure energy observed
cAverage of 51.27 and 50.26° C., no residual cure energy observed
dAverage of 98.35 and 95.87° C., no residual cure energy observed
eAverage of 124.92 and 124° C., no residual cure energy observed

Example 8

A. Determination of Stroke Cure Time Using a 25/75 Wt % Blend of CHDM MGE and CHDM DGE Containing Oligomeric Components with DGE BPA and a Polyamide Curing Agent A portion (1.0121 g, 0.00592 epoxide eq) of the master batch from Example 7 Part A was combined with polyamide curing agent (0.6749 g, 0.00592 amine hydrogen eq) described in Example 7 Part A. Immediately after thoroughly mixing, a 0.15-0.20 g aliquot of the formulation was applied to a stroke cure hot plate (Tetrahedron, San Diego, Calif.) which had been preheated to 100° C. A stop watch was used to time each test which was run in accordance with ASTM D 4640-86 (adapted) giving the time required to change the fluid formulation into a thermoset, rigid, immovable solid. A minimum of 3 individual tests were run, with the mean and sample standard deviation calculated for each series of tests providing the average stroke cure time.

B. Determination of Stroke Cure Time Using a 25/75 Wt % Blend of CHDM MGE and CHDM DGE Containing Oligomeric Components with DGE BPA and a Modified Cycloaliphatic Amine Curing Agent A portion (0.8936 g, 0.00523 epoxide eq) of the master batch from Example 7 Part A was combined with a modified cycloaliphatic amine curing agent (0.5906 g, 0.00523 amine hydrogen eq) described in Example 7 Part B. The stroke cure time was determined using the method of Example 8 Part A above.

C. Determination of Stroke Cure Time Using a 25/75 Wt. % Blend of CHDM MGE and CHDM DGE Containing Oligomeric Components with DGE BPA and a Phenalkamine Curing Agent A portion (1.3347 g, 0.00781 epoxide eq) of the master batch from Example 7 Part A. was combined with a phenalkamine curing agent (0.9758 g, 0.00781 amine hydrogen eq) described in Example 7 Part C. The stroke cure time was determined using the method of Example 8 Part A above.

D. Determination of Stroke Cure Time and DSC Using a 25/75 Wt. % Blend of CHDM MGE and CHDM DGE Containing Oligomeric Components with DGE BPA and a Polyalkylenepolyamine Curing Agent A portion (1.3939 g, 0.00815 epoxide eq) of the master batch from Example 7 Part A was combined with triethylenetetramine curing agent (0.1989 g, 0.00815 amine hydrogen eq) described in Example 7 Part D. The stroke cure time was determined using the method of Example 8 Part A above. DSC analysis completed using 11.1 mg and 10.3 mg portions of the formulation gave an exothermic transition attributable to curing with maxima at 94.63° C. and 93.63° C. (average of 94.13° C.) accompanied by enthalpies of 508.0 joules per g and 555.9 joules per g, respectively (average of 532.0 joules per g). The onset temperature for this exothermic transition was 59.24° C. and 57.61° C., respectively (average of 58.43° C.).

| Designation | Average Stroke Cure Time (min) |
|---|---|
| Example 8 Part A | 3.468 +/− 0.0045 |
| Example 8 Part B | 6.433 +/− 0.165 |
| Example 8 Part C | 6.024 +/− 0.0508 |
| Example 8 Part D | 3.162 +/− 0.0344 |

Example 9

A. Solvent, Moisture, and Corrosion Resistance Testing of the Clear, Unfilled Casting Prepared Using a 25/75 Wt % Blend of CHDM MGE and CHDM DGE Containing Oligomeric Components with DGE BPA and a Polyamide Curing Agent A set of six 1 inch by 0.5 inch pieces were cut from the clear, unfilled casting prepared in Example 7 Part A using the method given in said Example. All test pieces were wiped clean then weighed before placing into either a glass 4 ounce bottle or a plastic (high density polyethylene) bottle, as specified in the following. Individual glass bottles containing a test sample were filled with 50 mL of dichloromethane, toluene, acetone, or 5 wt % acetic acid in DI water, respectively, then sealed. Individual plastic bottles containing a test sample were filled with 50 mL of DI water or 5 wt % sodium hydroxide (97%) in DI water, respectively, then sealed. All bottles were held at 23.5° C., except that containing DI water which was held in an oven at 50° C. After 24 hr, 48 hr, 144 hr, 504 hr and additionally 52 days for 5% acetic acid, 5% NaOH and 50° C. DI water only, each test sample was removed, blotted dry, observed for any changes, weighed, and then replaced back into the bottle to resume testing. The following results were obtained:

| Test Medium | Change in Weight (%)/Observations | | | | |
|---|---|---|---|---|---|
| — | 24 hr | 48 hr | 144 hr | 504 hr | 52 days |
| dichloromethane | a | — | — | — | — |
| toluene | +0.378 | +0.850 | +2.980 | +9.712 | — |
| acetone | +5.187 | +7.689b | +13.791b | +16.537c | — |
| 5% acetic acid | +7.105 | +10.428 | +18.750b | +38.328d | +42.32e |
| 5% NaOH | +0.184 | +0.280 | +0.525 | +1.076 | +1.72 |
| DI water (50° C.) | +1.071 | +1.506 | +2.490 | +2.890 | +2.73 | a spalling after 7.2 hr, terminate test,
bsolvent "windowpane" in test piece,
csolvent "windowpane" disappeared after 216 hr, rubbery,
dsolvent "windowpane" is now gone, rubbery,
erubbery, internal cracks

B. Solvent, Moisture, and Corrosion Resistance Testing of the Clear, Unfilled Casting Prepared Using a 25/75 Wt./Wt. % Blend of CHDM MGE and CHDM DGE Containing Oligomeric Components with DGE BPA and a Modified Cycloaliphatic Amine Curing Agent A set of six 1 inch by 0.5 inch pieces were cut from the clear, unfilled casting prepared in Example 7 Part B using the method given in said Example. All test pieces were tested using the method given in Example 9 Part A above. The following results were obtained:

| Test Medium | Change in Weight (%)/Observations | | | | |
|---|---|---|---|---|---|
| — | 24 hr | 48 hr | 144 hr | 504 hr | 52 days |
| dichloromethane | a | — | — | — | — |
| toluene | −0.075 | −0.075 | +0.083 | +0.456 | — |
| acetone | +9.379b | +12.948c | — | — | — |
| 5% acetic acid | +0.563 | +0.840 | +1.567 | +2.909 | +4.095 |
| 5% NaOH | +0.246 | +0.374 | +0.663 | +1.215 | +1.56 |
| DI water (50° C.) | +1.135 | +1.450 | +1.740 | +0.944 | +0.207d | a spalling after 7.2 hr, terminate test,
bsolvent "windowpane" in test piece,
ccracking in solvent "windowpane", terminate test,
dsmall "bubbles" in test piece

C. Solvent, Moisture, and Corrosion Resistance Testing of the Clear, Unfilled Casting Prepared Using a 25/75 wt % Blend of CHDM MGE and CHDM DGE Containing Oligomeric Components with DGE BPA and a Phenalkamine Curing Agent A set of six 1 inch by 0.5 inch pieces were cut from the clear, unfilled casting prepared in Example 7 Part C using the method given in said Example. All test pieces were tested using the method given in Example 9 Part A above. The following results were obtained:

| Test Medium | Change in Weight (%)/Observations | | | | |
|---|---|---|---|---|---|
| — | 24 hr | 48 hr | 144 hr | 504 hr | 52 days |
| dichloromethane | a | — | — | — | — |
| toluene | +17.500b | +26.115 b | +38.506c | — | — |
| acetone | +12.434b | +17.592 b | +25.296d | — | — |
| 5% acetic acid | +0.412 | +0.600 | +1.097 | +2.099 | +3.21 |
| 5% NaOH | +0.188 | +0.278 | +0.532 | +1.015 | +1.42 |
| DI water (50° C.) | +0.649 | +0.903 | +1.364 | +1.599 | +1.59 | a spalling after 7.2 hr, terminate test,
bsolvent "windowpane" in test piece
ccracked in half, solvent "windowpane" present, terminate test
dshort crack on one corner, solvent "windowpane" present, terminate test

D. Solvent, Moisture, and Corrosion Resistance Testing of the Clear, Unfilled Casting Prepared Using a 25/75 Wt % Blend of CHDM MGE and CHDM DGE Containing Oligomeric Components with DGE BPA and a Polyalkylenepolyamine Curing Agent A set of six 1 inch by 0.5 inch pieces were cut from the clear, unfilled casting prepared in Example 7 Part D using the method given in said Example. All test pieces were tested using the method given in Example 9 Part A above. The following results were obtained:

| Test Medium | Change in Weight (%)/Observations | | | | | |
|---|---|---|---|---|---|---|
| — | 24 hr | 48 hr | 144 hr | 504 hr | 36 days | 52 days |
| dichloromethane | +13.878 | a | — | — | — | — |
| Toluene | −0.072 | −0.072 | +0.080 | −0.024 | +0.064 | +0.144b |
| Acetone | +0.072 | +0.129 | +0.402 | +1.358 | +2.121 | +2.87c |
| 5% acetic acid | +0.607 | +0.920 | +1.657 | +3.286 | +4.307b | +5.27b |
| 5% NaOH | +0.112 | +0.185 | +0.361 | +0.754 | +0.995 | +1.22 |
| DI water (50° C.) | +0.543 | +0.777 | +1.416 | +2.936 | +3.567 | +3.92 | a edges are cracking, spalling, terminate test,
bedge chips,
csolvent "windowpane" in test piece

Comparative Experiment H

A. Solvent, Moisture, And Corrosion Resistance Testing of the Clear, Unfilled Casting Prepared Using A 25/75 Wt./Wt. % Blend of cis, trans-1,4-Cyclohexanedimethanol Mono And Diglycidyl Ether Containing Oligomeric Components with DGE BPA and a Polyamide Curing Agent A set of six 1 inch by 0.5 inch pieces were cut from the clear, unfilled casting prepared in Comparative Experiment G Part A using the method given in said Comparative Experiment. All test pieces were tested using the method given in Example 9 Part A. The following results were obtained:

| Test Medium | Change in Weight (%)/Observations | | | | |
|---|---|---|---|---|---|
| — | 24 hr | 48 hr | 144 hr | 504 hr | 52 days |
| dichloro-methane | a | — | — | — | — |
| toluene | +0.076b | +0.236b | +0.867b | +4.400 | — |
| acetone | +5.210 | +7.710c | +13.820c,d | — | — |
| 5% acetic acid | +7.439 | +10.658 | +19.005c | +37.539e | +40.83g |
| 5% NaOH | +0.227 | +0.345 | +0.640 | +1.280f | +2.03f |
| DI water (50° C.) | +1.261 | +1.796 | +2.890 | +3.440 | +3.31h | a spalling after 7.2 hr, terminate test,
bfine slivers coming off of one edge,
csolvent "windowpane" in test piece,
dall 4 corners cracked, terminate test,
esolvent "windowpane" is now gone, rubbery,
fedge chips,
grubbery, internal cracks,
h"bubbles" in test piece

B. Solvent, Moisture, And Corrosion Resistance Testing of the Clear, Unfilled Casting Prepared Using A 25/75 Wt./Wt. % Blend of cis, trans-1,4-Cyclohexanedimethanol Mono And Diglycidyl Ether Containing Oligomeric Components With DGE BPA and a Modified Cycloaliphatic Amine Curing Agent A set of six 1 inch by 0.5 inch pieces were cut from the clear, unfilled casting prepared in Comparative Experiment G Part B using the method given in said Comparative. Experiment. All test pieces were tested using the method given in Example 9 Part A. The following results were obtained:

| Test Medium | Change in Weight (%)/Observations | | | | |
|---|---|---|---|---|---|
| — | 24 hr | 48 hr | 144 hr | 504 hr | 52 days |
| dichloro-methane | a | — | — | — | — |
| toluene | −0.077 | −0.034 | +0.145 | +1.242 | — |
| acetone | +11.396b | +13.733c | — | — | — |
| 5% acetic acid | +0.612 | +0.901 | +1.614 | +2.957 | +4.104 |
| 5% NaOH | +0.256 | +0.401 | +0.725 | +1.270 | +1.57 |
| DI water (50° C.) | +1.189 | +1.511 | +1.650 | +0.764 | −0.059d | a spalling after 7.2 hr, terminate test,
bsolvent "windowpane" in test piece,
ccracking in solvent "windowpane", spalling, terminate test,
d"bubbles", microcracking in test piece

C. Solvent, Moisture, And Corrosion Resistance Testing of the Clear, Unfilled Casting Prepared Using A 25/75 Wt./Wt. % Blend of cis, trans-1,4-Cyclohexanedimethanol Mono And Diglycidyl Ether Containing Oligomeric Components With DGE BPA And A Phenalkamine Curing Agent A set of six 1 inch by 0.5 inch pieces were cut from the clear, unfilled casting prepared in Comparative Experiment G Part C using the method given in said Comparative Experiment. All test pieces were tested using the method given in Example 9 Part A. The following results were obtained:

| Test Medium | Change in Weight (%)/Observations | | | | |
|---|---|---|---|---|---|
| — | 24 hr | 48 hr | 144 hr | 504 hr | 52 days |
| dichloro-methane | a | — | — | — | — |
| toluene | +20.080b | +31.192b,c | +40.728d | — | — |
| acetone | +14.692b | +21.497b,e | — | — | — |
| 5% acetic acid | +0.529 | +0.668 | +1.223 | +2.317 | +3.49 |
| 5% NaOH | +0.139 | +0.234 | +0.408 | +0.816 | +1.14 |
| DI water (50° C.) | +0.708 | +0.987 | +1.389 | +1.529 | +1.54 | a spalling after 7.2 hr, terminate test,
bsolvent "windowpane" in test piece,
csolvent "windowpane", internally cracked around solvent "windowpane",
dcracked in half, solvent "windowpane" present, terminate test,
esolvent "windowpane, all 4 corners cracked, terminate test

D. Solvent, Moisture, And Corrosion Resistance Testing of the Clear, Unfilled Casting Prepared Using A 25/75 Wt./Wt. % Blend of cis, trans-1,4-Cyclohexanedimethanol Mono And Diglycidyl Ether Containing Oligomeric Components With DGE BPA And A Polyalkylenepolyamine Curing Agent A set of six 1 inch by 0.5 inch pieces were cut from the clear, unfilled casting prepared in Comparative Experiment G Part D using the method given in said Comparative Experiment. All test pieces were tested using the method given in Example 9 Part A. The following results were obtained:

| Test Medium | Change in Weight (%)/Observations | | | | | |
|---|---|---|---|---|---|---|
| — | 24 hr | 48 hr | 144 hr | 504 hr | 36 days | 52 days |
| dichloro-methane | +17.622a | b | — | — | — | — |
| toluene | −0.058 | −0.050 | −0.050 | −0.008 | +0.083 | +0.182a |
| acetone | +0.199 | +0.340 | +0.870 | +2.668 | +4.05c | +5.37c |
| 5% acetic acid | +1.059 | +1.138 | +1.986 | +3.880 | +5.068a | +6.17a |
| 5% NaOH | +0.133 | +0.215 | +0.406 | +0.844 | +1.101 | +1.35a |

-continued

| Test Medium | Change in Weight (%)/Observations | | | | |
|---|---|---|---|---|---|
| — | 24 hr | 48 hr | 144 hr | 504 hr | 36 days | 52 days |
| DI water (50° C.) | +0.670 | +0.942 | +1.670 | +3.389 | +4.051 | +4.40 | aedge chips,
bedge chips, solvent "windowpane", spalling, terminate test,
cedge chips, solvent "windowpane"

E. Solvent, Moisture, And Corrosion Resistance Testing of A Clear, Unfilled Casting Prepared Using A DGE BPA And A Polyalkylenepolyamine Curing Agent A set of six 1 inch by 0.5 inch pieces were cut from the clear, unfilled casting prepared in Comparative Experiment G Part E using the method given in said Comparative Experiment. All test pieces were tested using the method given in Example 9 Part A. The following results were obtained:

| Test Medium | Change in Weight (%)/Observations | | | | | |
|---|---|---|---|---|---|---|
| — | 24 hr | 48 hr | 144 hr | 504 hr | 36 days | 52 days |
| dichloromethane | +5.572 | +9.908a | +23.506 b | — | — | |
| toluene | −0.073 | −0.073 | −0.081 | −0.056 | 0.000 | +0.056 |
| acetone | +0.024 | +0.024 | +0.112 | +0.487 | +0.837 | +1.16 |
| 5% acetic acid | +0.209 | +0.321 | +0.571 | +1.157 | +1.543 | +1.88 |
| 5% NaOH | +0.133 | +0.187 | +0.327 | +0.685 | +0.903 | +1.10 |
| DI water (50° C.) | +0.392 | +0.600 | +1.087 | +2.398 | +2.782 | +2.95 | asolvent "windowpane" in test piece which was first observed after 72 hr of exposure,
bsolvent "windowpane", cracked after 312 hr, terminate test,

Example 10

A. Determination of Stroke Cure Time And DSC Using A 25/75 Wt % Blend of CHDM MGE And CHDM DGE Containing Oligomeric Components With DGE BPA And A Polyalkylenepolyamine Curing Agent With 2,4,6-tris(Dimethylaminomethyl)phenol Accelerator A portion (1.9869 g, 0.01162 epoxide eq) of the master batch from Example 7 Part A was combined with 2,4,6-tris (dimethylaminomethyl)phenol (0.1135 g, 5 phr) and thoroughly mixed to give a homogeneous solution. Triethylenetetramine curing agent (0.2836 g, 0.01162 amine hydrogen eq) was added and thoroughly mixed into the formulation. The triethylenetetramine curing agent is described in Example 3 Part B. The stroke cure time was determined using the method of Example 8 Part A. DSC analysis completed using 10.3 mg and 11.1 mg portions of the formulation characterized the exothermic cure. The results are given in the table at the end of Example 10.

B. Determination of Stroke Cure Time And DSC Using A 25/75 Wt % Blend of CHDM MGE And CHDM DGE Containing Oligomeric Components With DGE BPA And A Polyalkylenepolyamine Curing Agent With 2,4-Dimethylphenol Accelerator A portion (2.2345 g, 0.0131 epoxide eq) of the master batch from Example 7 Part A. was combined with 2,4-dimethylphenol (0.1277 g, 5 phr) and thoroughly mixed to give a homogeneous solution. Triethylenetetramine curing agent (0.3189 g, 0.0131 amine hydrogen eq) was added and thoroughly mixed into the formulation. The triethylenetetramine curing agent is described in Example 3 Part B. The stroke cure time was determined using the method of Example 8 Part A. DSC analysis completed using 10.3 mg and 10.7 mg portions of the formulation characterized the exothermic cure. The results are given in the table at the end of Example 10.

C. Determination of Stroke Cure Time And DSC Using A 25/75 Wt % Blend of CHDM MGE And CHDM DGE Containing Oligomeric Components With DGE BPA And A Polyalkylenepolyamine Curing Agent With p-Toluenesulfonic Acid Monohydrate Accelerator A portion (2.0315 g, 0.0119 epoxide eq) of the master batch from Example 7 Part A was combined with p-toluenesulfonic acid monohydrate (0.1161 g, 5 phr) and thoroughly mixed to give a suspension. Triethylenetetramine curing agent (0.2899 g, 0.0119 amine hydrogen eq) was added and thoroughly mixed into the formulation. The triethylenetetramine curing agent is described in Example 3 Part B. The stroke cure time was determined using the method of Example 8 Part A. DSC analysis completed using 9.9 mg and 14.6 mg portions of the formulation characterized the exothermic cure. The results are given in the table at the end of Example 10.

D. Determination of Stroke Cure Time And DSC Using A 25/75 Wt./Wt. % Blend of cis, trans-1,3- And 1,4-Cyclohexanedimethanol Mono And Diglycidyl Ether Containing Oligomeric Components With Diglycidyl Ether of Bisphenol A And A Polyalkylenepolyamine Curing Agent With Valeric Acid Accelerator A portion (2.3130 g, 0.0135 epoxide eq) of the master batch from Example 7 Part A was combined with valeric acid (0.1322 g, 5 phr) and thoroughly mixed to give a homogeneous solution. Triethylenetetramine curing agent (0.3301 g, 0.0135 amine hydrogen eq) was added and thoroughly mixed into the formulation. The curing agent is described in Example 3 Part B. The stroke cure time was determined using the method of Example 8 Part A. DSC analysis completed using 9.6 mg and 12.4 mg portions of the formulation characterized the exothermic cure. The results are given in the following table.

| Designation | Onset °C. | Maximum °C. | Enthalpy joules/g | Average Stroke Cure Time min |
|---|---|---|---|---|
| Example 10 A. | 66.34a | 97.15b | 573.0c | 2.711 +/− 0.0190 |
| Example 10 B. | 50.21d | 87.29e | 541.4f | 1.703 +/− 0.0167 |
| Example 10 C. | 53.11g | 89.58h | 595.2i | 1.523 +/− 0.0116 |
| Example 10 D. | 50.30j | 89.50k | 522.1l | 2.354 +/− 0.019 | aAverage of 66.19 and 66.49° C.,
bAverage of 96.72 and 97.58° C.,
cAverage of 573.0 and 573.0 joules/g,
dAverage of 49.29 and 51.12° C.,
eAverage of 87.11 and 87.47° C.,
fAverage of 530.8 and 551.9 joules/g,
gAverage of 54.09 and 52.12° C.,
hAverage of 89.54 and 89.62° C.,
iAverage of 707.5 and 482.9 joules/g,
jAverage of 49.37 and 51.22° C.,
kAverage of 88.99 and 90.00° C.,
lAverage of 517.6 and 526.6 joules/g Comparative Experiment I Determination of Stroke Cure Time Using A Diglycidyl Ether of Bisphenol A And A Polyalkylenepolyamine Curing Agent A portion (1.9579 g, 0.01064 epoxide eq) of DGE BPA described in Example 7 Part A was combined with triethylenetetramine curing agent (0.2596 g, 0.01064 amine hydrogen eq). The curing agent used is described in Example 3. The stroke cure time was determined using the method of Example 8 Part A. A stroke cure time of 2.592 min +1/− 0.0216 min was obtained.

Example 11

Preparation And Characterization of Viscosity of Blends of CHDM DGE Containing Oligomeric Components With DGE BPA A series of blends were prepared by mixing a CHDM DGE containing oligomeric components with DGE BPA described in Example 1 Part B. GC analysis of the CHDM DGE containing oligomeric components revealed 95.8 area % CHDM DGE (24.39, 32.61, 12.42, and 26.38 area % for the 4 individual isomers), 3.7 area % oligomers (>46 minor components), with the balance as several minor impurities. Titration demonstrated 27.74% epoxide (155.13 EEW). Viscosity (25° C.) averaged 86 cp. The blends were prepared by mixing 0.200 g (10 wt. %), 0.500 g (25 wt. %), or 1.000 g (50 wt %) of CHDM DGE containing oligomeric components with 1.800 g, 1.500 g or 1.000 g, respectively, of DGE BPA. The following viscosities (25° C.) were measured for the blends:

| CHDM DGE in Blend (wt %) | Viscosity cp |
|---|---|
| 10 | 3550 |
| 25 | 1617.5 |
| 50 | 496.7 |

Example 12

Preparation And Characterization of Blends of CHDM MGE And CHDM DGE Mixture Containing Oligomeric Components (Produced By Lewis Acid Catalyzed Coupling And Epoxidation Reactions) With DGE BPA An epoxy resin was prepared via Lewis acid catalyzed coupling of epi and CHDM using tin (IV) chloride in the coupling reaction followed by epoxidation reaction. GC analysis revealed the presence of 0.06 area % unreacted CHDM, 4.19 area % CHDM MGE, 58.73 area % CHDM DGE, 36.79 area % oligomers, with the balance as several minor components. The ionic and hydrolyzable and total chlorides were analyzed giving no detectable hydrolyzable chloride, no detectable ionic chloride and 3.52% total chloride. Titration of an aliquot of the product demonstrated 27.42% epoxide (156.93 EEW). Viscosity of 2 separate aliquots of the product at 25° C. was determined on an I.C.I. Cone and Plate Viscometer giving average values of 65 cp and 66 cp, respectively. A commercial grade DGE BPA assayed 23.097% epoxide (186.30 EEW) by titration. Kinematic viscosity of the DGE BPA was 9659 cSt (25° C.). ASTM D445-06 Standard Test Method for Kinematic Viscosity of Transparent and Opaque Liquids (and Calculation of Dynamic Viscosity) was used. Using these components, blends were prepared and measured for kinematic viscosity, as follows:

| CHDM MGE & CHDM DGE Mixture wt % (g) | Kinematic Viscosity cSt (25° C.) | Density g/mL (25° C.) | Calculated Viscosity cp (25° C.) |
|---|---|---|---|
| none | 9659 | 1.157a | 11176 |
| 1.00 (0.40) | 9151 | 1.15642b | 10582 |
| 3.00 (1.24) | 7050 | 1.15526b | 8145 |
| 5.00 (2.11) | 6293 | 1.1541b | 7263 |
| 7.00 (3.01) | 5059 | 1.1529b | 5833 |
| 10.00 (4.44) | 3987 | 1.1512b | 4590 |
| 15.00 (7.06) | 2711 | 1.1483b | 3113 |
| 20.00 (10.00) | 1962 | 1.1454b | 2247 |
| 30.00 (17.14) | 1085 | 1.1396b | 1236 |
| 100.00 | 63.38 | 1.099a | 65, 66c | ameasured value,
bextrapolated value,
cmeasured I.C.I. Cone and Plate viscosities It will be obvious to persons skilled in the art that certain changes may be made in the compositions and methods described above without departing from the scope of the present invention. It is therefore intended that all matter herein disclosed be interpreted as illustrative only and not as limiting the scope of protection sought. Moreover, the compositions and processes of the present invention are not to be limited by the specific examples set forth above including the tables to which they refer. Rather, these examples and the tables they refer to are illustrative of the compositions and processes of the present invention.

What is claimed is:
1. An epoxy resin reactive diluent composition comprising an epoxy resin diluent (A) and a resin compound (B), wherein the epoxy resin diluent (A) comprises a cis, trans-1,3- and -1,4-cyclohexanedimethylether moiety and the resin compound (B) comprises one or more epoxy resins other than the epoxy resin diluent (A).

2. The composition according to claim 1, wherein the composition comprises from about 0.5 percent to about 99 percent by weight of the epoxy resin diluent (A) based upon the total weight of the composition.

3. The composition according to claim 1, wherein the epoxy resin diluent (A) comprises:
(i) a diglycidyl ether of cis-1-3-cyclohexanedimethanol; a diglycidyl ether of trans-1,3-cyclohexanedimethanol; a diglycidyl ether of cis-1,2-cyclohexanedimethanol; and a diglycidyl ether of trans-1,4-cyclohexanedimethanol;
(ii) a diglycidyl ether of cis-1,3-cyclohexanedimethanol; a diglycidyl ether of trans-1,3-cyclohexanedimethanol; a diglycidyl ether of cis-1,4-cyclohexanedimethanol; a diglycidyl ether of trans-1,4-cyclohexanedimethanol; and any oligomer thereof;
(iii) a diglycidyl ether of cis-1,3-cyclohexanedimethanol; a diglycidyl ether of trans-1,3-cyclohexanedimethanol; a diglycidyl ether of cis-1,4-cyclohexanedimethanol; a diglycidyl ether of trans-1,4-cyclohexanedimethanol; a monoglycidyl ether of cis-1,3-cyclohexanedimethanol; a monoglycidyl ether of trans-1,3-cyclohexanedimethanol; a monoglycidyl ether of cis-1,4-cyclohexanedimethanol; and a monoglycidyl ether of trans-1,4-cyclohexanedimethanol; or
(iv) a diglycidyl ether of cis-1,3-cyclohexanedimethanol; a diglycidyl ether of trans-1,3-cyclohexanedimethanol; a diglycidyl ether of cis-1,4-cyclohexanedimethanol; a diglycidyl ether of trans-1,4-cyclohexanedimethanol; a monoglycidyl ether of cis-1,3-cyclohexanedimethanol; a monoglycidyl ether of trans-1,3-cyclohexanedimethanol; a monoglycidyl ether of cis-1,4-cyclohexanedimethanol; a monoglycidyl ether of trans-1,4-cyclohexanedimethanol; and any oligomer thereof.

4. The composition according to claim 3, wherein the epoxy resin diluent (A) comprises a controlled amount of the monoglycidyl ether of cis-1,3-cyclohexanedimethanol; monoglycidyl ether of trans-1,3-cyclohexanedimethanol; monoglycidyl ether of cis-1,4-cyclohexanedimethanol; and monoglycidyl ether of trans-1,4-cyclohexanedimethanol: and where in the epoxy resin diluent (A) comprises from about 0.1 percent to about 90 percent by weight of the monoglycidyl ether of cis-1,3-cyclohexanedimethanol; monoglycidyl ether of trans-1,3-cyclohexanedimethanol; monoglycidyl ether of cis-1,4-cyclohexanedimethanol; and monoglycidyl ether of trans-1,4-cyclohexanedimethanol based on the total weight of the epoxy resin diluent (A).

5. A curable epoxy resin composition comprising a blend of (a) an epoxy resin reactive diluent composition and (b) at least one curing agent and/or at least one curing catalyst; wherein the epoxy resin reactive diluent composition comprises an epoxy resin diluent (A) and a resin compound (B); and wherein the epoxy resin diluent (A) comprises a cis, trans-1,3- and -1,4-cyclohexanedimethylether moiety and the resin compound (B) comprises one or more epoxy resins other than the epoxy resin diluent (A).

6. The composition according to claim 5, wherein the curing agent comprises a material having at least one reactive hydrogen atom per molecule, and the epoxy resin reactive diluent composition comprises at least one epoxide group, and the reactive hydrogen atom in the curing agent is reactive with the epoxide group in the epoxy resin reactive diluent composition; and wherein the curing agent comprises from about 0.80:1 to about 1.50:1 equivalents of reactive hydrogen atom in the curing agent per equivalent of epoxide group in the curable epoxy resin composition.

7. The composition according to claim 5 further comprising at least one additive; and wherein the additive comprises at least one of a cure accelerator, a solvent, a diluent other than the epoxy resin reactive diluent (A), a filler, a pigment, a dye, a flow modifier, a thickener, a reinforcing agent, a mold release agent, a wetting agent, a stabilizer, a fire retardant agent, a surfactant, and any combination thereof.

8. The composition according to claim 7, wherein the diluent other than the epoxy resin diluent (A) comprises at least one of a non-reactive diluent, a monoepoxide diluent, a diluent other than the epoxy resin diluent (A), a reactive non-epoxide diluent, and any combination thereof.

9. A process comprising curing the curable epoxy resin composition according to claim 5.

10. The process according to claim 9, wherein the process comprises partially curing the curable epoxy resin composition to form a B-stage product and subsequently curing the B-stage product completely at a later time.

11. A cured epoxy resin prepared by the process according to claim 9.

12. An article comprising the cured epoxy resin according to claim 11; and wherein the article is at least one of a coating, an electrical or structural laminate, an electrical or structural composite, a filament winding, a molding, a casting, and an encapsulation.

* * * * *